(12) United States Patent
Doshi et al.

(10) Patent No.: US 12,166,626 B2
(45) Date of Patent: Dec. 10, 2024

(54) METHODS, APPARATUS, AND ARTICLES OF MANUFACTURE FOR WORKLOAD PLACEMENT IN AN EDGE ENVIRONMENT

(71) Applicant: Intel Corporation, Santa Clara, CA (US)

(72) Inventors: Kshitij Arun Doshi, Tempe, AZ (US); Ned M. Smith, Beaverton, OR (US); Francesc Guim Bernat, Barcelona (ES)

(73) Assignee: INTEL CORPORATION, Santa Clara, CA (US)

( * ) Notice: Subject to any disclaimer, the term of this patent is extended or adjusted under 35 U.S.C. 154(b) by 930 days.

(21) Appl. No.: 17/033,324

(22) Filed: Sep. 25, 2020

(65) Prior Publication Data

US 2021/0014114 A1 Jan. 14, 2021

(51) Int. Cl.
*H04L 41/0806* (2022.01)
*H04L 41/0826* (2022.01)
(Continued)

(52) U.S. Cl.
CPC ...... *H04L 41/0806* (2013.01); *H04L 41/0895* (2022.05); *H04L 41/122* (2022.05); *H04L 41/342* (2022.05); *H04L 41/40* (2022.05); *H04L 41/5019* (2013.01); *H04L 45/036* (2022.05); *H04L 41/0826* (2013.01); *H04L 41/083* (2013.01)

(58) Field of Classification Search
CPC ....... H04L 41/08; H04L 41/0893–0895; H04L 41/40; H04L 41/50–5025; H04L 41/0823–0836; H04L 41/12–122; H04L 41/342; H04L 45/036–0377; H04L 45/56–563; H04L 67/01; H04L 67/10
See application file for complete search history.

(56) References Cited

U.S. PATENT DOCUMENTS 11,089,092 B1 * 8/2021 Seibel ................ H04L 41/0816
2019/0116128 A1  4/2019 Guo et al.
(Continued)

OTHER PUBLICATIONS

Gold, "Report: Smart-City IoT isn't smart enough yet," Network World, [https://www.networkworld.com/article/3411561/report-smart-city-iot-isnt-smart-enough-yet.html], Jul. 25, 2019, 4 pages.
(Continued)

*Primary Examiner* — Brendan Y Higa
(74) *Attorney, Agent, or Firm* — HANLEY, FLIGHT & ZIMMERMAN, LLC

(57) ABSTRACT

Methods, apparatus, systems and articles of manufacture are disclosed for workload placement in an edge environment. An example apparatus for workload placement in an edge environment includes an orchestrator to receive a request to execute a workload from an edge platform within an edge environment, and a capability controller to analyze the request to determine operating parameters for the workload from the edge platform, and analyze candidate edge tier and edge platform placements based on the operating parameters, the orchestrator to determine a candidate edge tier and edge platform placement for the workload based on a candidate edge tier and edge platform placement that satisfies the operating parameters.

34 Claims, 16 Drawing Sheets

(51) Int. Cl.
*H04L 41/083* (2022.01)
*H04L 41/0895* (2022.01)
*H04L 41/122* (2022.01)
*H04L 41/342* (2022.01)
*H04L 41/40* (2022.01)
*H04L 41/5019* (2022.01)
*H04L 45/036* (2022.01)

(56) References Cited

U.S. PATENT DOCUMENTS

| | | | |
|---|---|---|---|
| 2019/0140919 A1* | 5/2019 | Smith | H04L 67/51 |
| 2019/0281132 A1* | 9/2019 | Sethuraman | H04L 9/3247 |
| 2020/0007414 A1 | 1/2020 | Smith et al. | |
| 2020/0228602 A1* | 7/2020 | Spoczynski | H04L 67/1021 |
| 2021/0004265 A1* | 1/2021 | Guim Bernat | H02J 4/00 |
| 2021/0014133 A1* | 1/2021 | Maciocco | H04L 41/5009 |
| 2021/0250250 A1* | 8/2021 | Reznik | H04L 41/5019 |

OTHER PUBLICATIONS

Vaporio, "Vapor IO's Kinectic Edge," [https://www.vapor.io/], Mar. 29, 2018, retrieved on Jan. 27, 2021, 10 pages.

Edgeconnex, "Empower Your Edge: Hyperlocal To Hyperscale Data Centers," [https://www.edgeconnex.com/], Mar. 25, 2018, retrieved on Jan. 27, 2021, 5 pages.

Yousefpour et al., "All one Needs to Know About Fog Computing and Related Edge Computing Paradigms," Feb. 13, 2019, 48 pages.

European Patent Office, "Extended European Search Report," issued in connection with European patent application No. 21189018.1 issued on Jan. 18, 2022, 11 pages.

\* cited by examiner

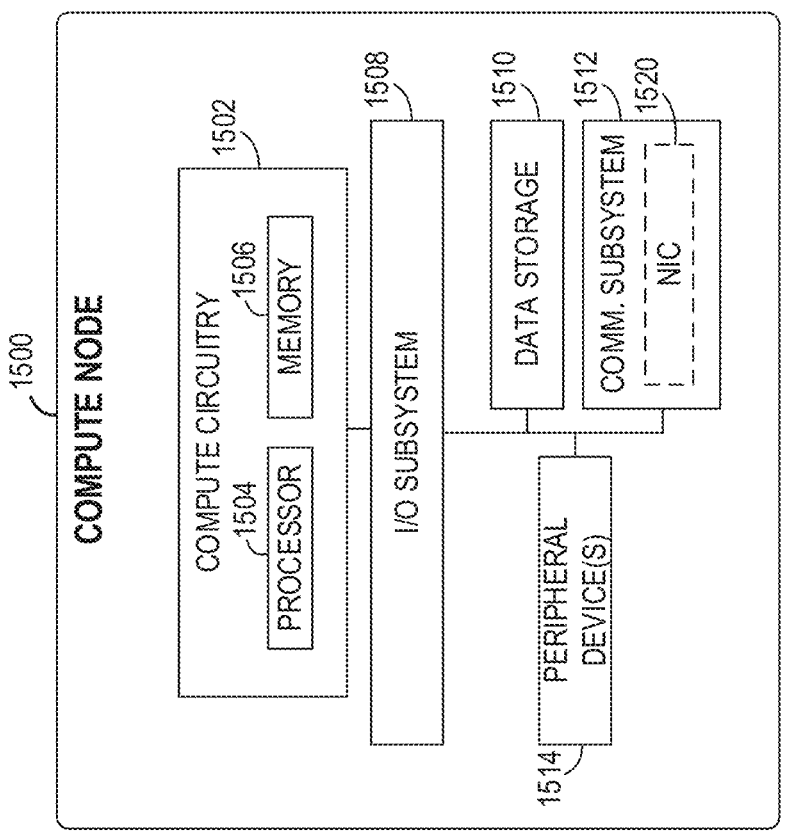

METHODS, APPARATUS, AND ARTICLES OF MANUFACTURE FOR WORKLOAD PLACEMENT IN AN EDGE ENVIRONMENT

FIELD OF THE DISCLOSURE

This disclosure relates generally to edge environments, and, more particularly, to methods, apparatus, and articles of manufacture for workload placement in an edge environment.

BACKGROUND

Edge environments (e.g., an Edge, a network edge, Fog computing, multi-access edge computing (MEC), or Internet of Things (IoT) network) enable a workload execution (e.g., an execution of one or more computing tasks, an execution of a machine learning model using input data, etc.) closer or near endpoint devices that request an execution of the workload. Edge environments may include infrastructure (e.g., network infrastructure), such as an edge service, that is connected to cloud infrastructure, endpoint devices, or additional edge infrastructure via networks such as the Internet. Edge services may be closer in proximity to endpoint devices than cloud infrastructure, such as centralized servers.

BRIEF DESCRIPTION OF THE DRAWINGS

FIG. 15A is a block diagram of an example implementation of an example compute node that may be deployed in one of the edge computing systems illustrated in FIGS. 9-12 and/or 14 in accordance with teachings of this disclosure.

Figure 1:
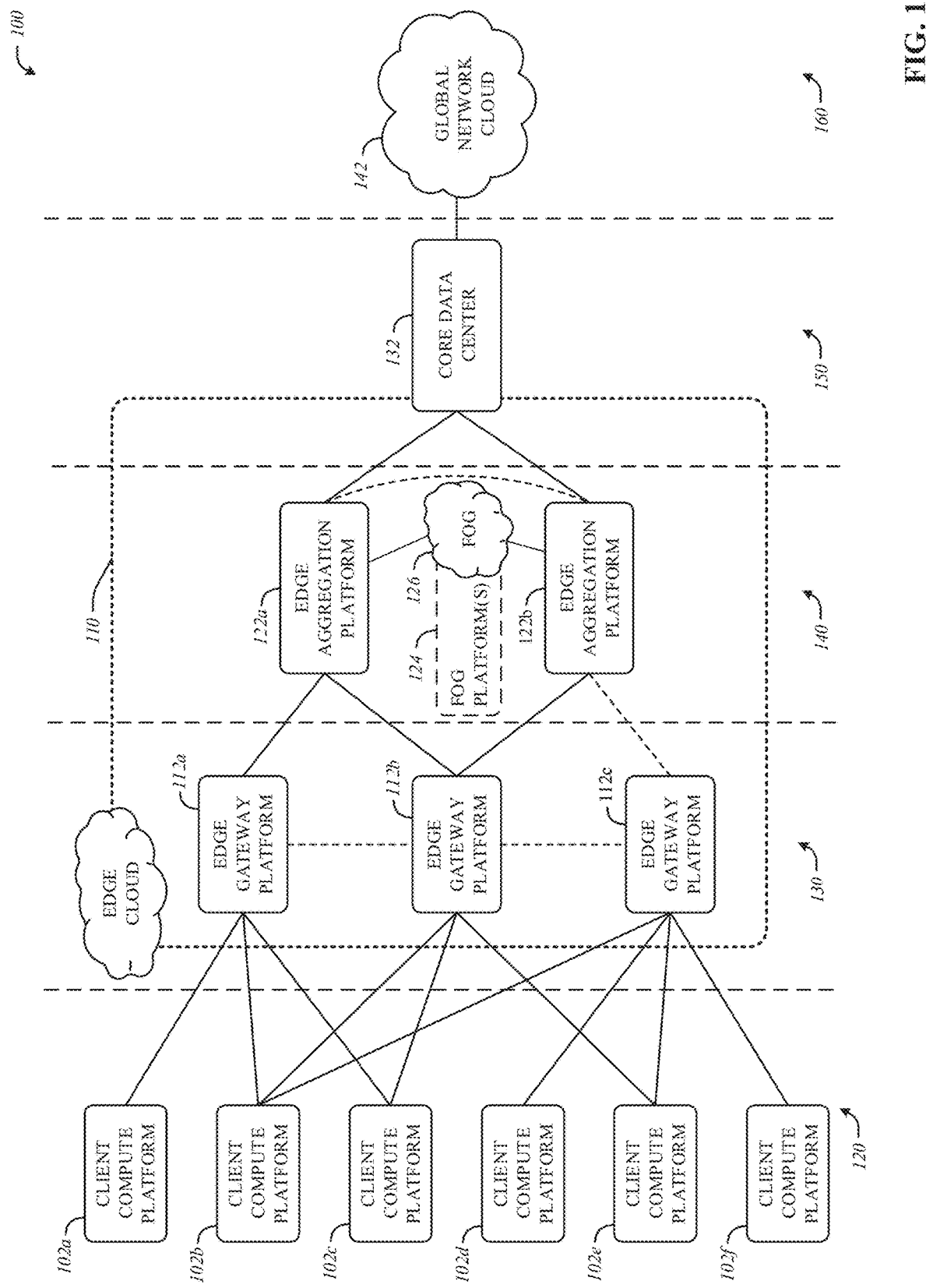
FIG. 1 depicts an example edge computing system for providing edge services and applications in accordance with teachings of this disclosure.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with data privacy or security requirements. Edge computing may, in some scenarios, provide a cloud-like distributed service that offers orchestration and management for applications among many types of storage and compute resources. As a result, some implementations of edge computing have been referred to as the "edge cloud" or the "fog," as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (e.g., devices, hosts, tenants, service providers, operators, etc.) are involved.

In a similar manner, Internet of Things (IoT) networks and devices are designed to offer a distributed compute arrangement from a variety of endpoints. IoT devices can be physical or virtualized objects that may communicate on a network, and can include sensors, actuators, and other input/output components, which may be used to collect data or perform actions in a real-world environment. For example, IoT devices can include low-powered endpoint devices that are embedded or attached to everyday things, such as buildings, vehicles, packages, etc., to provide an additional level of artificial sensory perception of those things. In recent years, IoT devices have become more popular and thus applications using these devices have proliferated.

In some examples, an edge environment can include an enterprise edge in which communication with and/or communication within the enterprise edge can be facilitated via wireless and/or wired connectivity. The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices.

The present techniques and configurations may be utilized in connection with many aspects of current networked systems, but are provided with reference to Edge Cloud, IoT, Multi-access Edge Computing (MEC), and other distributed computing deployments. The following systems and techniques may be implemented in, or augment, a variety of distributed, virtualized, or managed edge computing systems. These include environments in which network services are implemented or managed using multi-access edge computing (MEC), fourth generation (4G) or fifth generation (5G) wireless network configurations; or in wired network configurations involving fiber, copper, and other connections. Further, aspects of processing by the respective computing components may involve computational elements which are in geographical proximity of a user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Edge computing is a developing paradigm where computing is performed at or closer to the "edge" of a network, typically through the use of a computing platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with computing hardware that performs virtualized network functions and offers compute resources for the execution of services and consumer functions for connected devices.

Edge environments include networks and/or portions of networks that are located between a cloud environment and an endpoint environment. Edge environments enable computations of workloads at edges of a network. For example, an endpoint device may request a nearby base station to compute a workload rather than a central server in a cloud environment. Edge environments include edge platforms, which include pools of memory, storage resources, and/or processing resources. Edge platforms perform computations, such as an execution of a workload, on behalf of other edge platforms and/or edge nodes. Edge environments facilitate connections between producers (e.g., workload executors, edge platforms) and consumers (e.g., other edge platforms, endpoint devices).

Because edge platforms may be closer in proximity to endpoint devices than centralized servers in cloud environments, edge platforms enable computations of workloads with a lower latency (e.g., response time) than cloud environments while also suffering less communication delay and network usage for transmission of data, computation requests and results, in comparison with those suffered in cloud environments. Edge platforms may also enable a localized execution of a workload based on geographic locations or network topographies. For example, an endpoint device may require a workload to be executed in a first geographic area, but a centralized server may be located in a second geographic area. The endpoint device can request a workload execution by an edge platform located in the first geographic area to comply with corporate or regulatory restrictions.

Examples of workloads to be executed in an edge environment include autonomous driving computations, video surveillance monitoring, machine learning model executions, and real time data analytics. Additional examples of workloads include delivering and/or encoding media streams, measuring advertisement impression rates, object detection in media streams, speech analytics, asset and/or inventory management, and augmented reality processing.

Edge platforms enable both the execution of workloads and a return of a result of an executed workload to endpoint devices with a response time lower than the response time of a server in a cloud environment. For example, if an edge platform is located closer to an endpoint device on a network than a cloud server, the edge service may respond to workload execution requests from the endpoint device faster than the cloud server. An endpoint device may request an execution of a time-constrained workload from an edge service rather than a cloud server.

In addition, edge platforms enable the distribution and decentralization of workload executions. For example, an endpoint device may request a first workload execution and a second workload execution. In some examples, a cloud server may respond to both workload execution requests. With an edge environment, however, a first edge platform may execute the first workload execution request, and a second edge platform may execute the second workload execution request.

To meet the low-latency and/or high-bandwidth demands of endpoint devices, orchestration in edge clouds is performed on the basis of timely information about the utilization of many resources (e.g., hardware resources, software resources, virtual hardware and/or software resources, etc.), and the efficiency with which those resources are able to meet the demands placed on them. Such timely information is generally referred to as telemetry (e.g., telemetry data, telemetry information, etc.).

Telemetry can be generated from a plurality of sources including each hardware component or portion thereof, virtual machines (VMs), operating systems (OSes), applications, and orchestrators. Telemetry can be used by orchestrators, schedulers, etc., to determine a quantity, quantities, and/or type of computation tasks to be scheduled for execution at which resource or portion(s) thereof, and an expected time to completion of such computation tasks based on historical and/or current (e.g., instant or near-instant) telemetry. For example, a core of a multi-core central processing unit (CPU) can generate over a thousand different varieties of information every fraction of a second using a performance monitoring unit (PMU) sampling the core and/or, more generally, the multi-core CPU. Periodically aggregating and processing all such telemetry in a given edge platform, edge node, etc., can be an arduous and cumbersome process. Prioritizing salient features of interest and extracting such salient features from telemetry to identify current or future problems, stressors, etc., associated with a resource is difficult. Furthermore, identifying a different resource to offload workloads from a burdened resource is a complex undertaking.

Some edge environments desire to obtain telemetry data associated with resources executing a variety of functions or services, such as data processing or video analytics functions (e.g., machine vision, image processing for autonomous vehicle, facial recognition detection, visual object detection, etc.). However, many high-throughput workloads, including one or more video analytics functions, may execute for less than a millisecond (or other relatively small time duration). Such edge environments do not have distributed monitoring software or hardware solutions or a combination thereof that are capable of monitoring such highly-granular stateless functions that are executed on a platform (e.g., a resource platform, a hardware platform, a software platform, a virtualized platform, etc.).

Many edge environments include a diversity of components for resource management and orchestration.

Given power and/or thermal restrictions at edge platforms (e.g., base stations) as opposed to those at more traditional, centralized cloud environments (e.g., central offices), dynamic, intelligent, and per-tenant power management policies at edge platforms can reduce and/or recover capital expenditures and/or operational expenditures associated with an edge architecture. For example, by monetizing all capabilities invested into an edge service provider's edge architecture, the edge provider can recover the capital expenditures and/or operational expenditures associated with the capabilities of the edge architecture. Some edge architectures can be powered by solar and wind energy. When computational resources and/or thermal conditions at an edge platform are powered by variable renewable energies (e.g., solar, wind, hydro, etc.) and/or with limited capacity battery backup, failing to provide accurate power management for services can degrade the reliability of edge platforms. Additionally, some edge architectures can have stable power (e.g., connected to the grid), however, balancing thermal conditions can be challenging in such edge architectures.

While original equipment manufacturers (OEMs) and silicon vendors consider power requirements and/or power supplies of distributed computing environments, many assume datacenter-like, continuously, and stably powered environments with uninterruptable power supplies and generators that are available for support during power outages. Many OEM and silicon vendor designs for edge platforms lack support for operating optimally and flexibly under dynamic power and/or thermal envelopes. Additionally, edge platforms can have different power-performance implications when operating in a traditional computing environment as opposed to operating in an edge environment.

Another challenge in edge environments is limited supply, not only with respect to power, but also with respect to elasticity of edge platforms. In extending traditional, datacenter-like cloud practices to hosting of applications in different edge locations, some factors to consider include: how many resources are allocated to each workload (e.g., service, application, etc.) at edge platforms; how and/or where to utilize accelerators to obtain good performance per watt; based on the power, which services to migrate between edge platforms to prevent spikes in power consumption; and how to balance power demand across service level agreements associated with various tenant workloads (e.g., based on policies).

The non-uniform and unpredictable demand that can occur in an edge environment along with the inelastic supply of power and/or other resources in an edge environment causes not only the user/tenant services/applications to consume power and/or other resources, but also the system software stack and edge platform management components that also consume power and hardware. For example, in some edge platforms the software stack and edge platform management components can utilize 30% of a footprint of the overall edge platform.

Examples disclosed herein include methods, apparatus, and articles of manufacture for workload placement in an edge environment to control processing of requests for workload execution an edge platform. Examples disclosed herein include receiving a request to execute a workload from an edge platform within an edge environment. Examples disclosed herein include analyzing the request to determine operating parameters for the workload from the edge platform. In some examples, determining the operating parameters includes deriving a subset of factors required for the operating parameters. In some examples, the subset of factors includes a level of security, a level of accuracy, dependencies of the edge platform on other microservices, a location of the dependencies within the edge environment, usage information of the edge platform, or service level agreement (SLA) attributes of the edge platform. In some examples, determining the operating parameters includes estimating resource requirements for the edge platform, the resource requirements including power measurements, thermal measurements, latency measurements and/or bandwidth measurements for the workload based on the subset of factors. In some examples, the resource requirements are updated based on updated operating parameters.

Examples disclosed herein include analyzing candidate edge tier and edge platform placements of workloads based on the operating parameters. In some examples, analyzing the candidate edge tier and edge platform placements includes determining resource availabilities of each of the candidate edge tier and edge platform placements. In some examples, the resource availabilities correspond to power availability, thermal availability, latency availability, and/or bandwidth availability at each of the candidate edge tier and edge platform placements based on telemetry data from each of the candidate edge tier and edge platform placements. Examples disclosed herein include determining a candidate edge tier and edge platform placement for the workload based on a candidate edge tier and edge platform placement that satisfies the operating parameters. In some examples, determining the candidate edge tier and edge platform placement for the edge platform includes: determining an operating parameter percentage for each of the candidate edge tier and edge platform placements, the operating parameter percentage corresponding to a percentage of the resource availabilities of an edge tier and edge platform placement that satisfy the resource requirements of the edge platform; selecting the edge tier and edge platform placement with the optimal operating parameter percentage as the candidate edge tier and edge platform placement; and implementing the workload at the candidate edge tier and edge platform placement. In some examples, in response to the operating parameter percentages for each of the candidate edge tier and edge platform placements not satisfying a threshold, resource requirements and a cost function weight are adjusted. As used herein, "cost function weight" or "cost function" refer to a penalty that increases with a magnitude of error (e.g., a number of iterations) to ensure accuracy and security during placement and execution of a workload.

In some examples, the cost function weight is used to bias the selection of a candidate edge tier and edge platform placement, progressively more conservatively, which refers to applying a higher cost function weight that corresponds to assigning more resources to increase a margin of safety before an SLA is violated, for example. In other words, the cost function weight is utilized in an optimization procedure or model to favor a higher allocation of resources to ensure an SLA is not violated. That is, after a first operation does not return any suitable candidate edge tier and edge platform placements (e.g., fail to meet an SLA threshold, fail to meet power resource requirement, etc.), another operation is performed with an adjusted value for the cost function and for the resource requirements. In some examples disclosed herein, any number of iterations may be used, until either there is no longer a violation of a projected SLA, or the projected latency and throughput diverge away from the SLA, or a maximum number of iterations or time for iterations is exceeded. Other examples may use a different convergence flow in which the iterative aspects described above are themselves integrated into a trained model.

Examples disclosed herein can collect incoming telemetry, projected future utilizations of different nodes based on the edge tier and edge platform placement decisions that are determined. Thus, current telemetry consists of both the actual measurements (that may be time shifted into the past by a small amount) and projected utilizations from ongoing request placement decisions.

In some examples, when an edge service provider determines early on that sufficient resources are just not available at and/or near a preferred edge platform location, it may source additional resources by paying premium costs for bursting into an edge co-location ("Co-Lo") infrastructure.

In some examples disclosed herein, cached results are periodically aged out to allow the system to adapt to changing conditions, instead of being locked into suboptimal solutions, for example, as statistics on SLA violations improve or degrade.

In some examples, data from incoming requests and from summarized telemetry, along with actual outcomes of placement decisions (whether they meet or do not meet SLA criteria) are summarized and uploaded to a backend cloud. They are used to train, or refine the training of the models that map from workload types (i.e., request types) and quantized SLAB to performance, bandwidth, and power needs. Similar offline training may be used to adjust the default weights for cost functions, for example.

Examples disclosed herein can be expanded with artificial intelligence (AI) objective-based techniques such as re-enforced learning. For example, the data generated and post-mortem performance and telemetry data per each of the services can be provided to AI models that afterwards can utilize the disclosed examples to have another input in the decision process. As in many other types of architectures, the re-enforced learning can be implemented in a centralized location (and fed back to the distributed layers) such as clouds or in a federated learning approach. The later may allow more specific learning based on geo-locations or different parts of the edge computing system 100, for example.

As used herein, "edge platform" refers to an edge gateway platform, an edge aggregation platform, a fog platform (e.g., a cloudlet), a core data center and/or a workload that is implemented/executed in an edge environment. In examples disclosed herein, the edge platform can be implemented by hardware, software, firmware and/or any combination of hardware, software and/or firmware. In examples disclosed herein, an edge platform distributes resources by making them available for assignment as computational assets assembled into virtual machines, pods, containers, etc. and provisioning the assembled virtual machines, pods, containers, etc. towards execution of workloads through aggregation and networking.

As used herein, "workload" refers to an application task that is specified as having various computational requirements, performance requirements, security requirements, cost requirements, etc. that is executed on a cloudlet (e.g., an assembly of virtualized resources (processor, memory, storage, acceleration units) etc. which is provisioned dynamically at one or more physical platforms).

As used herein, "edge node" refers to a number (one, two, 5, etc.) of internetworked machines which have processors, memory, etc., that are allocated in order to provision resources that a workload that will be executed at the edge node will require. In examples disclosed herein, determining an edge node also refers to determining an edge tier (near-edge, far-edge, access-edge, data center cloud, etc.) to execute a workload.

As used herein, "edge tier placement" and "edge tier and edge platform placement" refer to placement of a workload at an edge platform in an edge tier, and the selection of resources in the edge environment to be used in performing the computational operations for a given workload.

As used herein. "optimal operating parameter percentage" refers to a function combining a number of desirable operating parameters, such as i) available, ii) available and nearest, iii) available, nearest, and least expensive, iv) available, least expensive, and sufficiently near, etc. and determining a percentage associated with an edge tier and edge platform placement that includes the desirable operating parameters.

FIG. 1 depicts an example edge computing system 100 for providing edge services and applications to multi-stakeholder entities, as distributed among one or more client compute platforms 102, one or more edge gateway platforms 112, one or more edge aggregation platforms 122, one or more core data centers 132, and a global network cloud 142, as distributed across layers of the edge computing system 100. The implementation of the edge computing system 100 may be provided at or on behalf of a telecommunication service provider ("telco", or "TSP"), internet-of-things service provider, cloud service provider (CSP), enterprise entity, or any other number of entities. Various implementations and configurations of the edge computing system 100 may be provided dynamically, such as when orchestrated to meet service objectives.

Individual platforms or devices of the edge computing system 100 are located at a particular layer corresponding to layers 120, 130, 140, 150, and 160. For example, the client compute platforms 102a, 102b, 102c, 102d, 102e, 102f are located at an endpoint layer 120, while the edge gateway platforms 112a, 112b, 112c are located at an edge devices layer 130 (local level) of the edge computing system 100. Additionally, the edge aggregation platforms 122a, 122b (and/or fog platform(s) 124, if arranged or operated with or among a fog networking configuration 126) are located at a network access layer 140 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing, in many scenarios, provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 132 is located at a core network layer 150 (a regional or geographically central level), while the global network cloud 142 is located at a cloud data center layer 160 (a national or world-wide layer). The use of "core" is provided as a term for a centralized network location—deeper in the network—which is accessible by multiple edge platforms or components; however, a "core" does not necessarily designate the "center" or the deepest location of the network. Accordingly, the core data center 132 may be located within, at, or near the edge cloud 110. Although an illustrative number of client compute platforms 102a, 102b, 102c, 102d, 102e, 102f; edge gateway platforms 112a, 112b, 112c; edge aggregation platforms 122a, 122b; edge core data centers 132; and global network clouds 142 are shown in FIG. 1, it should be appreciated that the edge computing system 100 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 112a, 112b, 112c can be configured as an edge of edges such that the edge gateway platforms 112a, 112b, 112c communicate via peer to peer connections. In some examples, the edge aggregation platforms 122a, 122b and/or the fog platform(s) 124 can be configured as an edge of edges such that the edge aggregation platforms 122a, 122b and/or the fog platform(s) communicate via peer to peer connections. Additionally, as shown in FIG. 1, the number of components of respective layers 120, 130, 140, 150, and 160 generally increases at each lower level (e.g., when moving closer to endpoints (e.g., client compute platforms 102a, 102b, 102c, 102d, 102e, 102f). As such, one edge gateway platforms 112a, 112b, 112c may service multiple ones of the client compute platforms 102a, 102b, 102c, 102d, 102e, 102f, and one edge aggregation platform (e.g., one of the edge aggregation platforms 122a, 122b) may service multiple ones of the edge gateway platforms 112a, 112b, 112c.

Consistent with the examples provided herein, a client compute platform (e.g., one of the client compute platforms 102a, 102b, 102c, 102d, 102e, 102f) may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 100 does not necessarily mean that such platform, node, and/or device operates in a client or agent/minion/follower role; rather, any of the platforms, nodes, and/or devices in the edge computing system 100 refer to individual entities, platforms, nodes, devices, and/or subsystems which include discrete and/or connected hardware and/or software configurations to facilitate and/or use the edge cloud 110.

As such, the edge cloud 110 is formed from network components and functional features operated by and within the edge gateway platforms 112a, 112b, 112c and the edge aggregation platforms 122a, 122b of layers 130, 140, respectively. The edge cloud 110 may be implemented as any type of network that provides edge computing and/or storage resources which are proximately located to radio access network (RAN) capable endpoint devices (e.g., mobile computing devices, IoT devices, smart devices, etc.), which are shown in FIG. 1 as the client compute platforms 102a, 102b, 102c, 102d, 102e, 102f. In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 110 may form a portion of, or otherwise provide, an ingress point into or across a fog networking configuration 126 (e.g., a network of fog platform(s) 124, not shown in detail), which may be implemented as a system-level horizontal and distributed architecture that distributes resources. For example, the edge cloud 100 may form a portion of an ingress point into the fog network configuration 126 by making resources or functions available for assignment as computational assets assembled into virtual machines, pods, containers, etc. Further, the edge cloud 110 may provision the assembled virtual machines, pods, containers, etc. towards execution of workloads through aggregation and networking and services to perform a specific function. For instance, a coordinated and distributed network of fog platform(s) 124 may perform computing, storage, control, or networking aspects in the context of an IoT system arrangement. Other networked, aggregated, and distributed functions may exist in the edge cloud 110 between the core data center 132 and the client endpoints (e.g., client compute platforms 102a, 102b, 102c, 102d, 102e, 102f). Some of these are discussed in the following sections in the context of network functions or service virtualization, including the use of virtual edges and virtual services which are orchestrated for multiple tenants.

As discussed in more detail below, the edge gateway platforms 112a, 112b, 112c and the edge aggregation platforms 122a, 122b cooperate to provide various edge services and security to the client compute platforms 102a, 102b, 102c, 102d, 102e, 102f. Furthermore, because a client compute platform (e.g., one of the client compute platforms 102a, 102b, 102c, 102d, 102e, 102f) may be stationary or mobile, a respective edge gateway platform 112a, 112b, 112c may cooperate with other edge gateway platforms to propagate presently provided edge services, relevant service data, and security as the corresponding client compute platforms 102a, 102b, 102c, 102d, 102e, 102f moves about a region. To do so, the edge gateway platforms 112a, 112b, 112c and/or edge aggregation platforms 122a, 122b may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 100 includes meta-orchestration functionality. For example, edge platforms at the far-edge (e.g., edge platforms closer to edge users, the edge devices layer 130, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 140, the core network layer 150, a central office, a mini-datacenter, etc.). By offloading telemetry and/or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 110. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 910, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, billing and metering policies to improve an edge environment, improving the accuracy of results, reducing the likelihood and duration of transient interruptions, and otherwise improving the perceived quality of user experience.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other—these services create a "service chain". At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional through-put" or "timeliness"—in case of SDSi, the system and/or resource can sign up to guarantee specific service level specifications (SLS) and objectives (SLO) of a service level agreement (SLA). For example, SLOB can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 10 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit)

awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 2:
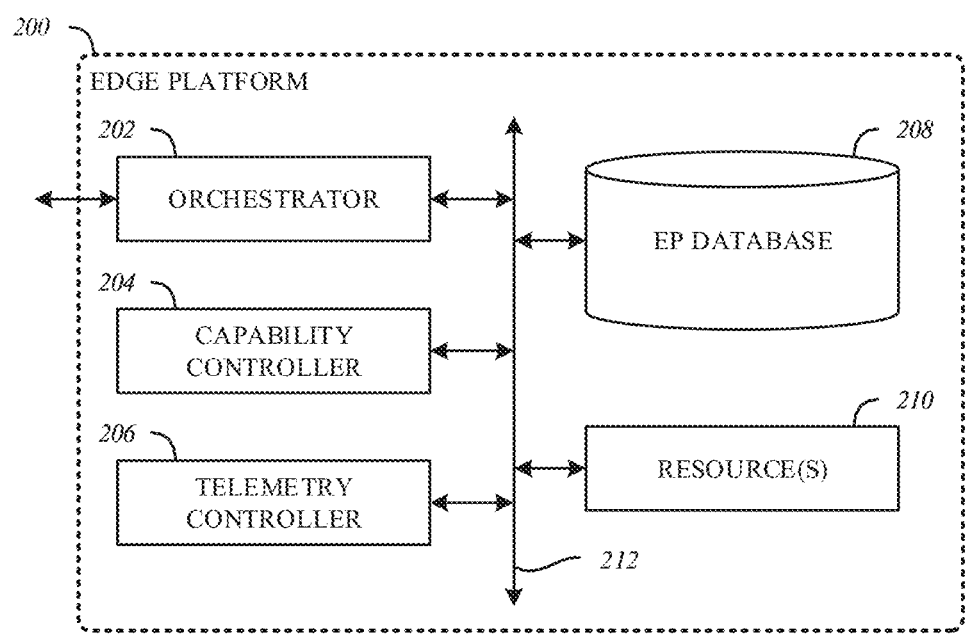
FIG. 2 depicts an example implementation of an edge platform to process requests received from client compute nodes in accordance with the teachings of this disclosure.

FIG. 2 depicts an example implementation of an edge platform 200 to process requests for workloads received from client compute nodes in accordance with the teachings of this disclosure. For example, any of the edge gateway platforms 112*a*, 112*b*, 112*c*; the edge aggregation platforms 122*a*, 122*b*; the fog platform(s) 124; and/or the core data center 132 can be implemented by the edge platform 200. The example edge platform 200 of FIG. 2 includes an example orchestrator 202, an example capability controller 204, an example telemetry controller 206, an example edge platform (EP) database 208, and example resource(s) 210. In the example of FIG. 2, any of the orchestrator 202, the capability controller 204, the telemetry controller 206, the EP database 208, and/or the resource(s) 210 may communicate via an example communication bus 212. In examples disclosed herein, the communication bus 212 may be implemented using any suitable wired and/or wireless communication. In additional or alternative examples, the communication bus 212 includes software, machine readable instructions, and/or communication protocols by which information is communicated among the orchestrator 202, the capability controller 204, the telemetry controller 206, the EP database 208, and/or the resource(s) 210. In some examples, the orchestrator 202 is a means for orchestrating, or an orchestrating means. In some examples, the capability controller 204 is a means for controlling capability, or a capability controlling means. In some examples, the telemetry controller 206 is a means for controlling telemetry, or a telemetry controlling means. In some examples, the EP database 208 is a means for storing, or a storing means. In some examples, the resource(s) 210 is a means for resources, or a resource means.

In some examples, the edge platform 200 may be used in conjunction with Information Centric Networking (ICN), where the ICN operates as a layer on top of an existing Edge network layer. For example, the ICN may be connected to the EP database 208 in the form of an ICN routing node that caches and replicates the EP database 208 contents over multiple edge platform(s) 200. In some examples, the ICN optimizes access to the EP database 208 by bringing the EP database 208 closer to other EP nodes seeking to read/write in the context of implementing the orchestrator 202, the capability controller 204, the telemetry controller 206, and/or the resource(s) 210.

In the example illustrated in FIG. 2, the orchestrator 202, the capability controller 204, the telemetry controller 206, the EP database 208, and the resource(s) 210 are included in, correspond to, and/or otherwise is/are representative of the edge platform 200. However, in some examples, one or more of the orchestrator 202, the capability controller 204, the telemetry controller 206, the EP database 208, and the resource(s) 210 can be included in an edge environment including the edge platform 200 (e.g., the edge cloud 110) rather than be included in the edge platform 200. For example, the orchestrator 202 can be connected to an endpoint layer (e.g., the endpoint layer 120), an edge device layer (e.g., the edge device layer 130), a network access layer (e.g., the network access layer 140), a core network layer (e.g., the core network layer 150), and/or a cloud data center layer (e.g., the cloud data center layer 160) while being outside of the edge platform 200.

In other examples, one or more of the orchestrator 202, the capability controller 204, the telemetry controller 206, the EP database 208, and the resource(s) 210 is/are separate devices included in an edge environment. Further, one or more of the orchestrator 202, the capability controller 204, the telemetry controller 206, the EP database 208, and the resource(s) 210 can be included in an edge device layer (e.g., the edge device layer 130), a network access layer (e.g., the network access layer 140), a core network layer (e.g., the core network layer 150), and/or a cloud data center layer (e.g., the cloud data center layer 160). For example, the orchestrator 202 can be included in an edge devices layer (e.g., the edge devices layer 130), or the resource(s) 210 can be included in a network access layer (e.g., the network access layer 140), a core network layer (e.g., the core network layer 150), and/or a cloud data center layer (e.g., the cloud data center layer 160).

In some examples, in response to a request to execute a workload from a client compute platform (e.g., one of the client compute platforms 102a, 102b, 102c, 102d, 102e, 102f) and/or an edge platform, the orchestrator 202 analyzes the request to determine operating parameters for the workload from the client compute platform (e.g., edge platform). In some examples, the orchestrator 202 can receive multiple requests and may de-duplicate the requests. That is, the orchestrator 202 may receive a plurality of request to execute "workload A." Instead of analyzing all of the requests for "workload A," the orchestrator 202 analyzes one of the requests for "workload A" and can populate the outcome to the remaining requests for "workload A" to save resources (e.g., thermal resources, computational resources, etc.).

To determine the operating parameters, the orchestrator 202 of the illustrated example derives a subset of factors required for the operating parameters. In some examples, the orchestrator 202 derives the subset of factors that includes a level of security, a level of accuracy, dependencies of the edge platform on other microservices, a location of the dependencies within the edge environment, usage information of the edge platform, or service level agreement (SLA) attributes of the edge platform and/or workload. The orchestrator 202 can derive the subset of factors from a look up table to save computing resources. For example, the orchestrator 202 may receive a request for "workload A" and look up "workload A" in a table and determine a subset of factors that include a specified level of security required to execute "workload A" or a service level agreement (SLA) attribute.

In some examples, when determining the operating parameters, the orchestrator 202 estimates resource requirements for the edge platform and/or workload. The resource requirements include power measurements, thermal measurements, latency measurements and/or bandwidth measurements for the workload based on the subset of factors. For example, the orchestrator 202 determines the subset of factors from a look up table and estimates the resource requirements needed to satisfy the subset of factors. The orchestrator 202 of the illustrated example updates the resource requirements based on updated operating parameters or subset of factors.

The orchestrator 202 of the illustrated example analyzes candidate edge tier and edge platform placements for the request(s) based on the operating parameters by determining resource availabilities of each of the candidate edge tier and edge platform placements. In some examples, the resource availabilities correspond to one or more of power availability, thermal availability, latency availability, and/or bandwidth availability at each of the candidate edge tier and edge platform placements based on telemetry data from each of the candidate edge tier and edge platform placements. In the illustrated example, the orchestrator 202 communicates with the capability controller 204 to determine the resource availabilities. The capability controller 204 determines the capabilities of the edge platform 200, the workloads (e.g., cloudlets) and other edge platform(s) 200. For example, the capability controller 204 generates capability data (e.g., thermal resources, power resources, bandwidth resources, hardware resources, storage resources, network resources, software resources, etc. at the edge platform 200). For example, the capability controller 204 can determine the resource(s) 210 allocated to the edge platform 200, such as, hardware resources (e.g., compute, network, security, storage, etc., hardware resources), software resources (e.g., a firewall, a load balancer, a virtual machine (VM), a guest operating system (OS), an application, a hypervisor, etc.), etc., and/or a combination thereof, based on the capability data, from which edge computing workloads (e.g., registered workloads) can be executed. In some examples, the capability controller 204 can determine containers provisioned and/or executing at the edge platform 200. For example, the capability controller 204 can identify micro-services associated with containers provisioned at the edge platform 200 and/or resources allocated to containers at the edge platform 200.

In some examples, the capability controller 204 retrieves the capability data from the EP database 208. For example, when the orchestrator 202 receives a request to execute a workload, the orchestrator 202 identifies, by accessing the capabilities controller 204 and/or the EP database 208, whether the capabilities of the edge platform 200 includes proper resource(s) to fulfill the workload task. For example, the orchestrator 202 receives a request to execute a workload that requires a processor with two cores, the orchestrator 202 can access the capabilities controller 204 and/or the EP database 208 to determine whether the edge platform 200 includes the capability to process the requested workload. That is, the orchestrator 202 accesses the capability controller 204 to determine resource availabilities to identify candidate edge tier and edge platform placements for a request (e.g., a workload).

In the example of FIG. 2, the capability controller 204 additionally determines the capabilities of new and/or additional resources allocated to the edge platform 200. For example, if the edge platform 200 is upgraded by an edge service provider to include additional computational resources, storage resources, and/or network resources, the capabilities controller 204 can register the additional resources and generate capability data associated with the additional resources. In some examples, the capability controller 204 can generate and/or transmit protocols to interface with resources (e.g., the resource(s) 210) at the edge platform 200 to one or more of the orchestrator 202, the telemetry controller 206, and/or the EP database 208.

In the illustrated example of FIG. 2, the telemetry controller 206 improves the distribution and execution of edge computing workloads (e.g., among edge platforms) based on telemetry data associated with edge platforms in an edge computing environment. For example, the telemetry controller 206 can determine that a first edge platform and/or a second edge platform has available one(s) of the resource(s) 210, such as hardware resources (e.g., compute, network, security, storage (e.g., non-volatile memory express), etc., hardware resources), software resources (e.g., a firewall, a load balancer, a virtual machine (VM), a guest operating system (OS), an application, a hypervisor, etc.), etc., and/or a combination thereof, based on telemetry data, from which edge computing workloads can be executed. In such examples, the telemetry data can include a utilization (e.g., a percentage of a resource that is utilized or not utilized), a delay (e.g., an average delay) in receiving a service (e.g., latency), a rate (e.g., an average rate) at which a resource is available (e.g., bandwidth, throughput, etc.), power expenditure, temperatures, etc., associated with one(s) of the resource(s) 210 of at least one of edge platform (e.g., the edge platform 200 and/or an alternative edge platform).

To determine a candidate edge tier and edge platform placement for the edge platform (e.g., the workload or cloudlet) based on a candidate edge tier and edge platform placement that satisfies the operating parameters, the orchestrator 202 determines an operating parameter percentage for each of the candidate edge tier and edge platform placements. The operating parameter percentage of the illustrated example corresponds to a percentage of the resource availabilities of an edge tier and edge platform placement that satisfy the resource requirements of the edge platform. For example, the orchestrator 202 may receive a request to execute a workload that requires a processor with two cores. In this example, the orchestrator 202 can access the capabilities controller 204 and/or the EP database 208 to determine operating parameter percentages for each of the candidate edge tier and edge platform placements. In this example, the orchestrator 202 may determine that one candidate edge tier and edge platform placement has an operating parameter percentage of 100% (i.e., has a processor with two cores), and the remaining candidate edge tier and edge platform placements have an operating parameter percentage of 0% (i.e., do not have a processor with two cores). The orchestrator 202 of the illustrated example selects the edge tier and edge platform placement with the optimal operating parameter percentage as the candidate edge tier and edge platform placement and implements the workload at the candidate edge tier and edge platform placement. In some examples, the orchestrator 202 determines an optimal operating parameter percentage by combining a number of desirable operating parameters, such as i) available, ii) available and nearest, iii) available, nearest, and least expensive, iv) available, least expensive, and sufficiently near, etc. and determining a percentage associated with an edge tier and edge platform placement that includes the desirable operating parameters. For example, the orchestrator 202 may determine that a candidate edge tier and edge platform placement is the nearest in the edge environment, is available and is the least expensive. As such, the orchestrator 202 may determine an optimal operating parameter percentage that is higher than other optimal operating parameter percentages (e.g., edge tier placements that are not available, more expensive, etc.).

In some examples, in response to the operating parameter percentages for each of the candidate edge tier and edge platform placements not satisfying a threshold (e.g., less than 70%, less than 40%, etc.), the orchestrator 202 adjusts the resource requirements and a cost function weight. For example, the orchestrator 202 can adjusts the resource requirements by lowering an operating parameter percentage threshold, reducing a cost function associated with how much money can be spent to execute the workload at a specific candidate edge tier and edge platform placement, etc. However, the orchestrator 202 may determine that after a threshold number of iterations (e.g., resource requirement and cost function adjustments) the request is identified as unable to be processed in the edge environment. For example, the cost associated with executing the workload does not satisfy a cost function threshold. In some examples, the cost function is a penalty factor that decreases the optimal operating parameter percentage. For example, the cost function corresponds to a penalty for exceeding a statistical threshold on latency, jitter, error rate, packet drops, network bandwidth consumptions, etc.

In the illustrated example of FIG. 2, the edge platform 200 include the EP database 208 to record data (e.g., telemetry data, workloads, capability data, resource availabilities, etc.). The EP database 208 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The EP database 208 can additionally or alternatively be implemented by double data rate (DDR) memories, such as DDR, DDR2, DDR3, DDR4, mobile DDR (mDDR), etc. The EP database 208 can additionally or alternatively be implemented by one or more mass storage devices such as hard disk drive(s), compact disk drive(s), digital versatile disk drive(s), solid-state disk drive(s), etc. While in the illustrated example the EP database 208 is illustrated as a single database, the EP database 208 can be implemented by any number and/or type(s) of databases. Furthermore, the data stored in the EP database 208 can be in any data format such as, for example, binary data, comma delimited data, tab delimited data, structured query language (SQL) structures, etc.

In the illustrated example of FIG. 2, the resource(s) 210 are invoked to execute a workload (e.g., an edge computing workload) obtained from a client compute platform. For example, the resource(s) 210 can correspond to and/or otherwise be representative of an edge platform or portion(s) thereof. For example, the orchestrator 202, the capability controller 204, the telemetry controller 206, the EP database 208, and/or, more generally, the edge platform 200 can invoke a respective one of the resource(s) 210 to execute one or more edge-computing workloads.

In some examples, the resource(s) 210 are representative of hardware resources, virtualizations of the hardware resources, software resources, virtualizations of the software resources, etc., and/or a combination thereof. For example, the resource(s) 210 can include, correspond to, and/or otherwise be representative of one or more CPUs (e.g., multi-core CPUs), one or more FPGAs, one or more GPUs, one or more network interface cards (NICs), one or more vision processing units (VPUs), etc., and/or any other type of hardware or hardware accelerator. In such examples, the resource(s) 210 can include, correspond to, and/or otherwise be representative of virtualization(s) of the one or more CPUs, the one or more FPGAs, the one or more GPUs, the one more NICs, etc. In other examples, the orchestrator 202, the capability controller 204, the telemetry controller 206, the EP database 208, the resource(s) 210, and/or, more generally, the edge platform 200, can include, correspond to, and/or otherwise be representative of one or more software resources, virtualizations of the software resources, etc., such as hypervisors, load balancers, OSes, VMs, etc., and/or a combination thereof.

In some examples, in response to a request to execute a workload from a client compute platform (e.g., one of the client compute platforms 102a, 102b, 102c, 102d, 102e, 102f), the orchestrator 202 communicates with at least one of the resource(s) 210 and the client compute platform (e.g., one of the client compute platforms 102a, 102b, 102c, 102d, 102e, 102f) to create a contract (e.g., a workload contract) associated with a description of the workload to be executed. The client compute platform (e.g., one of the client compute platforms 102a, 102b, 102c, 102d, 102e, 102f) provides a task associated with the contract and the description of the workload to the orchestrator 202, and the orchestrator 202 schedules the task to be executed at the edge platform. The task can include the contract and the description of the workload to be executed. In some examples, the task includes requests to acquire and/otherwise allocate resources used to execute the workload.

While an example manner of implementing the edge platform 200 of FIG. 1 is illustrated in FIG. 2, one or more of the elements, processes and/or devices illustrated in FIG. 2 may be combined, divided, re-arranged, omitted, eliminated and/or implemented in any other way. Further, the example orchestrator 202, the example capability controller 204, the example telemetry controller 206, the example EP database 208, the example resource(s) 210, and/or, more generally, the example edge platform 200 of FIG. 2 may be implemented by hardware, software, firmware and/or any combination of hardware, software and/or firmware. Thus, for example, any of the example orchestrator 202, the example capability controller 204, the example telemetry controller 206, the example EP database 208, the example resource(s) 210, and/or, more generally, the example edge platform 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example orchestrator 202, the example capability controller 204, the example telemetry controller 206, the example EP database 208, the example resource(s) 210, and/or, more generally, the example edge platform 200 is/are hereby expressly defined to include a non-transitory computer readable storage device or storage disk such as a memory, a digital versatile disk (DVD), a compact disk (CD), a Blu-ray disk, etc. including the software and/or firmware. Further still, the example edge platform 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the edge platform 200 are shown in FIGS. 3-6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example edge platform 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part.

Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
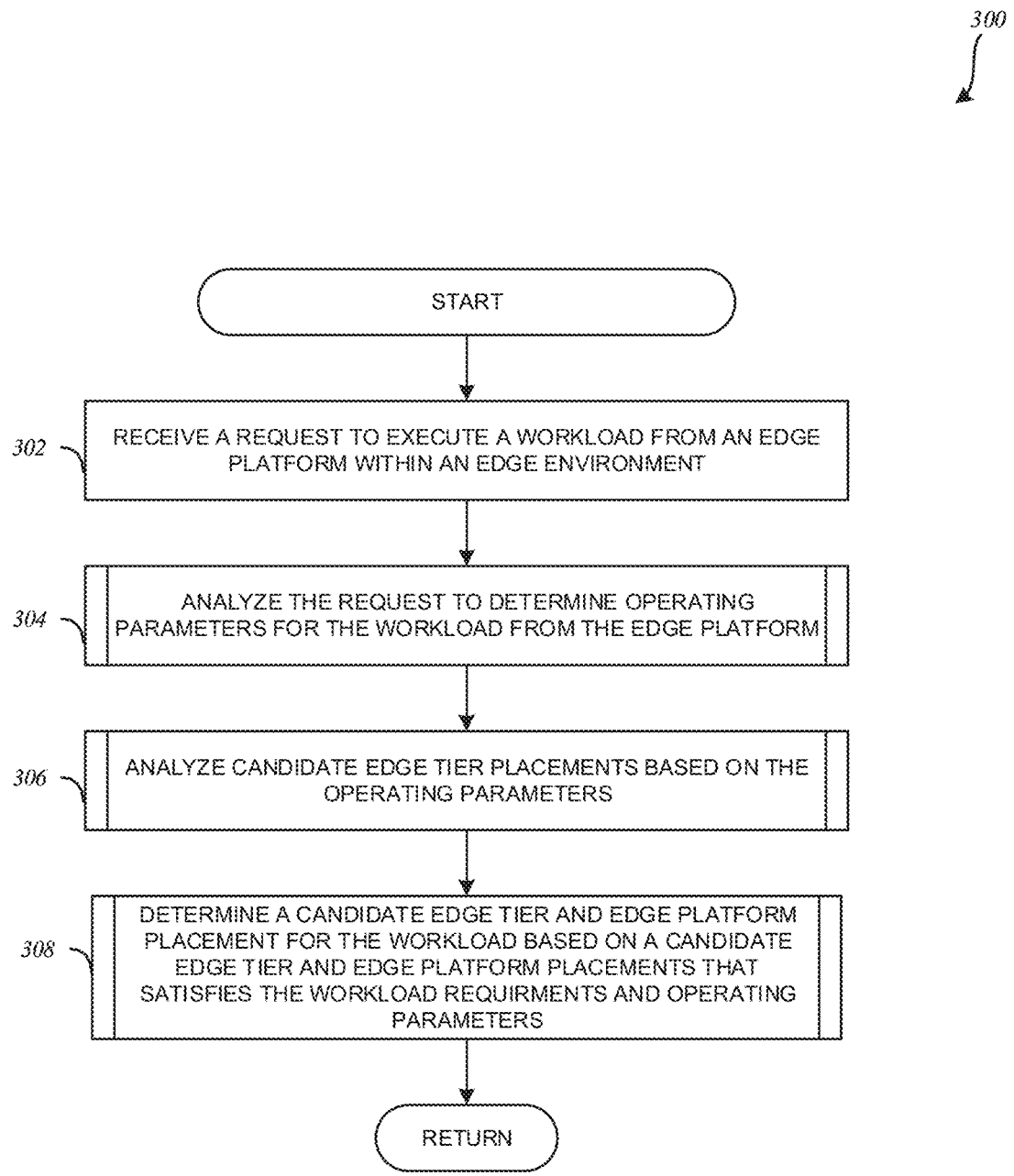
FIG. 3 is a flowchart representative of example machine readable instructions that may be executed to implement the example orchestrator of FIGS. 2 and/or 3 to determine a candidate edge tier and edge platform placement for a workload.

FIG. 3 is a flowchart representative of example machine readable instructions 300 that may be executed to implement the example edge platform 200 of FIG. 2. The machine readable instructions 300 begin at block 302 where the orchestrator 202 receives a request to execute a workload from an edge platform within an edge environment.

At block 304, the orchestrator 202 analyzes the request to determine operating parameters for the workload from the edge platform. For example, the orchestrator 202 derives a subset of factors required for the operating parameters.

At block 306, the orchestrator analyzes candidate edge tier and edge platform placements based on the operating parameters. For example, the orchestrator 202 of the illustrated example analyzes candidate edge tier and edge platform placements for the request(s) based on the operating parameters by determining resource availabilities of each of the candidate edge tier and edge platform placements.

At block 308, the orchestrator determines a candidate edge tier and edge platform placement for the workload based on a candidate edge tier and edge platform placement that satisfies the workload requirements and operating parameters. For example, the orchestrator 202 determines an operating parameter percentage for each of the candidate edge tier and edge platform placements. The operating parameter percentage of the illustrated example corresponds to a percentage of the resource availabilities of an edge tier and edge platform placement that satisfy the resource requirements of the workload. For example, the orchestrator 202 may receive a request to execute a workload that requires a processor with two cores. In this example, the orchestrator 202 can access the capabilities controller 204 and/or the EP database 208 to determine operating parameter percentages for each of the candidate edge tier and edge platform placements. In this example, the orchestrator 202 may determine that one candidate edge tier and edge platform placement has an operating parameter percentage of 100% (i.e., has a processor with two cores), and the remaining candidate edge tier and edge platform placements have an operating parameter percentage of 0% (i.e., do not have a processor with two cores). The orchestrator 202 of the illustrated example selects the edge tier and edge platform placement with the optimal operating parameter percentage as the candidate edge tier and edge platform placement and implements the workload at the candidate edge tier and edge platform placement. In some examples, in response to the operating parameter percentages for each of the candidate edge tier and edge platform placements not satisfying a threshold (e.g., less than 70%, less than 40%, etc.), the orchestrator 202 adjusts the resource requirements and a cost function weight. For example, the orchestrator 202 can adjusts the resource requirements by lowering an operating parameter percentage threshold, reducing a cost function associated with how much money can be spent, or how much data loss can be tolerated, or how much latency can be incurred, etc. to execute the workload at a specific candidate edge tier and edge platform placement, etc. However, the orchestrator 202 may determine that after a threshold number of iterations (e.g., resource requirement and cost function adjustments) the request is identified as unable to be processed in the edge environment. For example, the cost associated with executing the workload does not satisfy a cost function threshold. The machine readable instructions 300 terminate.

Figure 4:
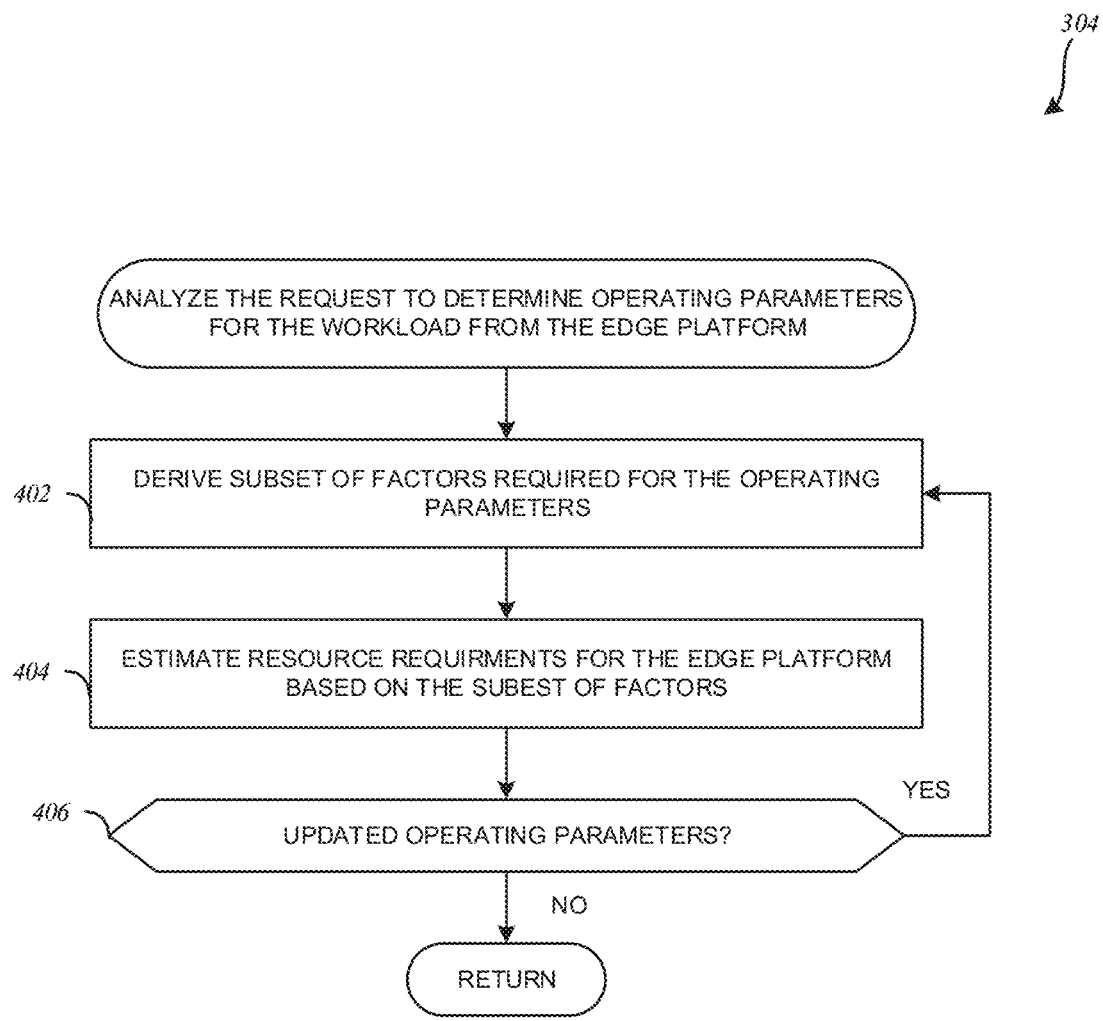
FIG. 4 is a flowchart representative of example machine readable instructions that may be executed to implement the example orchestrator of FIGS. 2 and/or 3 to analyze requests to determine operating parameters for workloads to be implemented in an edge platform.

FIG. 4 is a flowchart representative of example machine readable instructions 304 that may be executed to implement the example orchestrator 202 of FIG. 2 to analyze requests to determine operating parameters for a workload from the edge platform. The machine readable instructions 304 begin at block 402 where the orchestrator 202 derives a subset of factors required for the operating parameters. For example, the orchestrator 202 derives the subset of factors that includes a level of security, a level of accuracy, dependencies of the workload on other microservices, a location of the dependencies within the edge environment, usage information of the workload, or service level agreement (SLA) attributes of the workload. The orchestrator 202 can derive the subset of factors from a look up table to save computing resources. For example, the orchestrator 202 may receive a request for "workload A" and look up "workload A" in a table and determine a subset of factors that include a specified level of security required to execute "workload A" or a service level agreement (SLA) attribute.

At block 404, the orchestrator 202 estimates resource requirements for the workload based on the subset of factors. For example, the orchestrator 202 estimates resource requirements for the workload including, for example, power measurements, thermal measurements, latency measurements, and/or bandwidth measurements for each edge platform used to process the workload based on the subset of factors. For example, the orchestrator 202 determines the subset of factors from a look up table and estimates the resource requirements needed to satisfy the subset of factors.

At block 406, the orchestrator 202 determines if updated operating parameters are available. For example, the orchestrator 202 of the illustrated example updates the resource requirements based on updated operating parameters or subset of factors. If the orchestrator identifies that updated operating parameters are available, the machine readable instructions 304 proceed to block 402 to derive a subset of factors required for the operating parameters. For example, the orchestrator 202 may identify updated SLA attributes and proceed to derive an updated subset of factors required for the updated SLA attributes. If the orchestrator 202 determines that there are no updated operating parameters available, the machine readable instructions 304 return and proceed to block 306.

Figure 5:
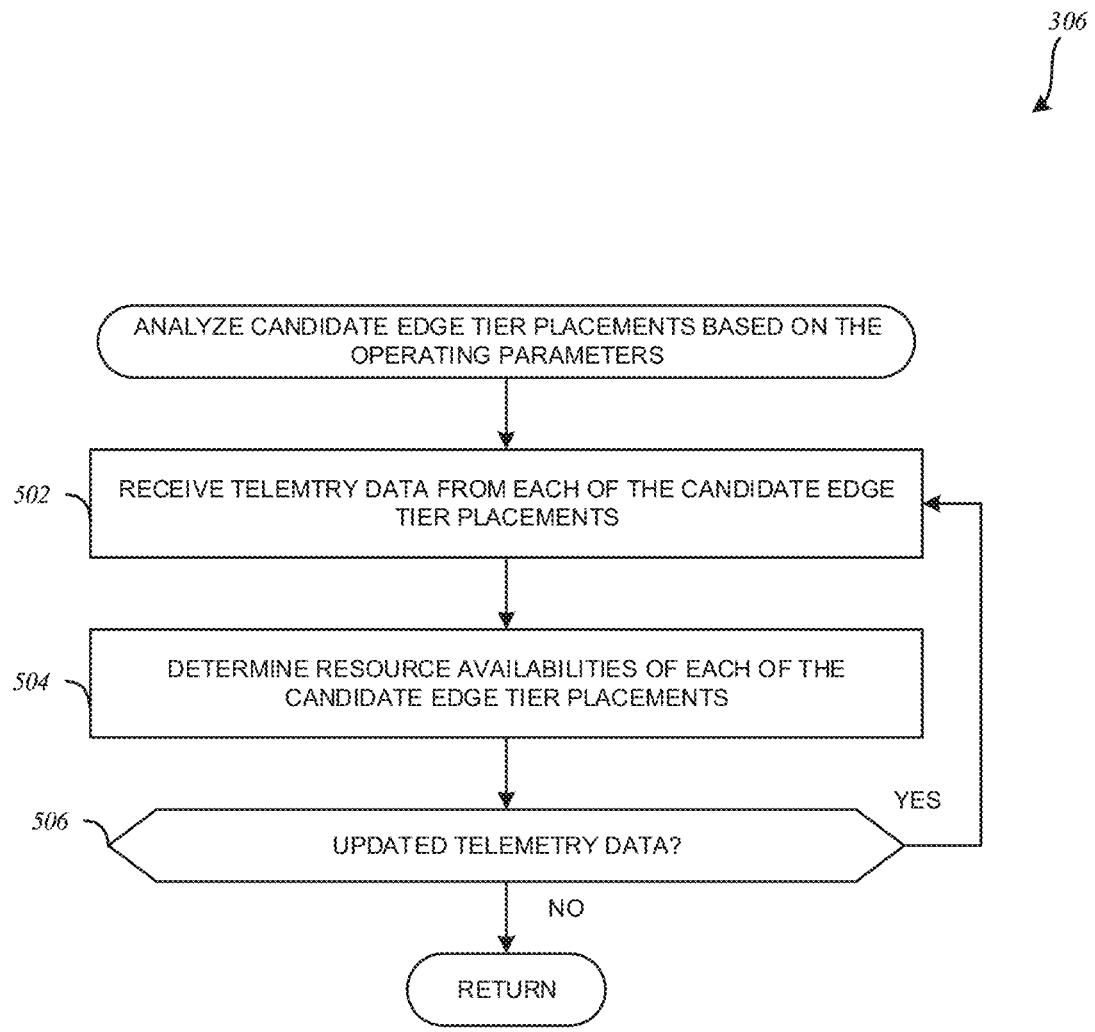
FIG. 5 is a flowchart representative of example machine readable instructions that may be executed to implement the example orchestrator of FIGS. 2 and/or 3 to analyze candidate edge tier and edge platform placements based on operating parameters.

FIG. 5 is a flowchart representative of example machine readable instructions 306 that may be executed to implement the example orchestrator 202 of FIG. 2 to analyze candidate edge tier and edge platform placements based on the operating parameters. The machine readable instructions 306 begin at block 502 where the orchestrator 202 receives telemetry data from each of the candidate edge tier and edge platform placements. For example, the orchestrator 202 may receive telemetry data corresponding to projected future utilizations of different nodes based on the edge tier and edge platform placement decisions that are determined, actual measurements (that may be time shifted into the past by a small amount) and projected utilizations from ongoing request placement decisions.

At block 504, the orchestrator 202 determines resource availabilities of each of the candidate edge tier and edge platform placements. For example, the resource availabilities correspond to power availability, thermal availability, latency availability, and/or bandwidth availability at each of the candidate edge tier and edge platform placements based on telemetry data from each of the candidate edge tier and edge platform placements. In some examples, the orchestrator 202 communicates with the capability controller 204 to determine the resource availabilities.

At block 506, the orchestrator 202 determines if updated telemetry data is available. If the orchestrator 202 determines that updated telemetry data is available, the machine readable instructions 306 proceed to block 502 to receive the telemetry data from each of the candidate edge tier and edge platform placements. If the orchestrator 202 determines that updated telemetry data is not available, the machine readable instructions 304 return and proceed to block 308.

Figure 6:
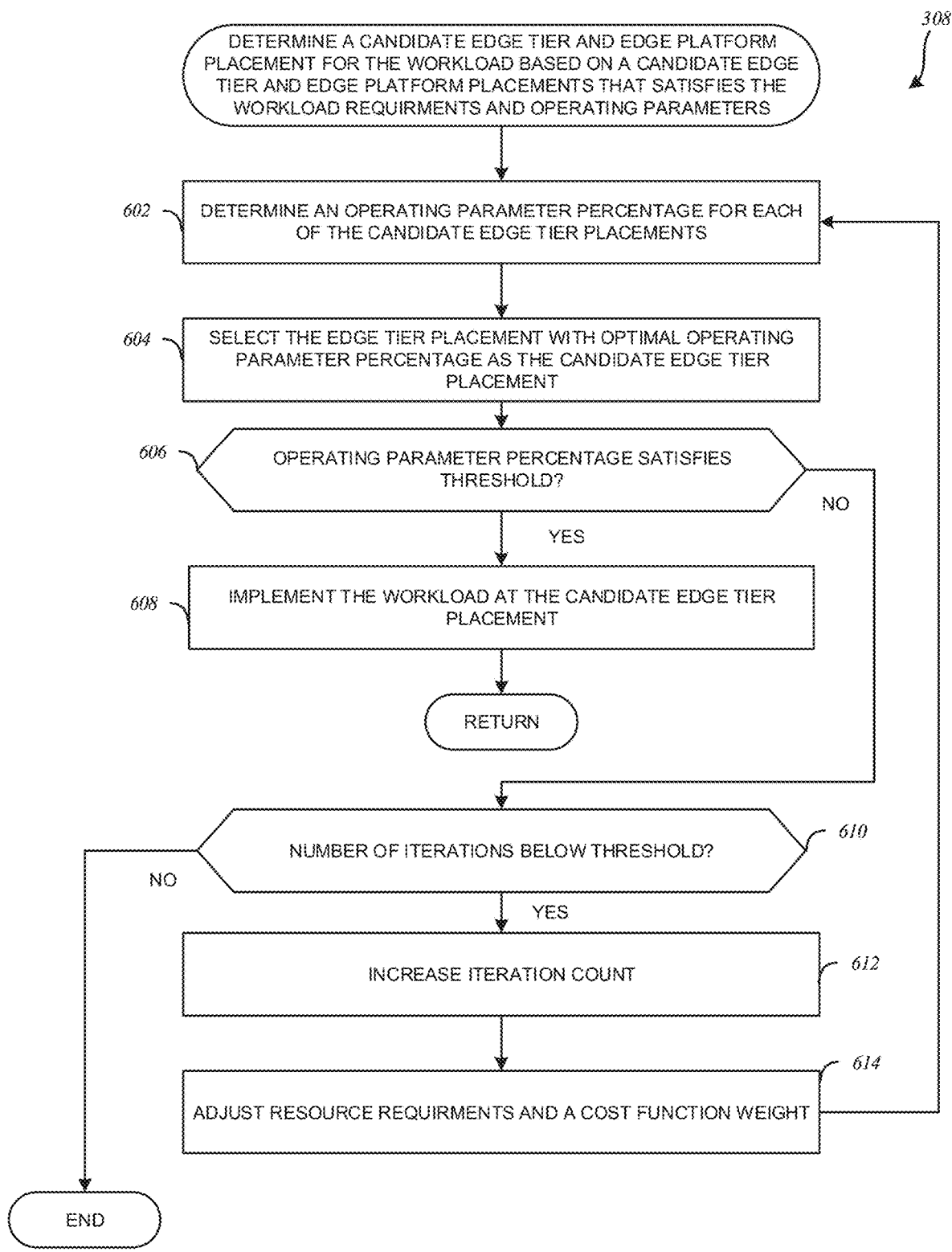
FIG. 6 is a flowchart representative of example machine readable instructions that may be executed to implement the example orchestrator of FIGS. 2 and/or 3 to determine a candidate edge tier and platform placement for a workload.

FIG. 6 is a flowchart representative of example machine readable instructions 308 that may be executed to implement the example orchestrator 202 of FIG. 2 to determine a candidate edge tier and edge platform placement for the workload based on a candidate edge tier and edge platform placement that satisfies the workload requirements and operating parameters. The machine readable instructions 308 begin at block 602 where the orchestrator 202 determines an operating percentage for each or the candidate edge tier and edge platform placements. For example, the orchestrator 202 determines an operating parameter percentage for each of the candidate edge tier and edge platform placements. The operating parameter percentage of the illustrated example corresponds to a percentage of the resource availabilities of an edge tier and edge platform placement that satisfy the resource requirements of the edge platform. For example, the orchestrator 202 may receive a request to execute a workload that requires a processor with two cores. In this example, the orchestrator 202 can access the capabilities controller 204 and/or the EP database 208 to determine operating parameter percentages for each of the candidate edge tier and edge platform placements. In this example, the orchestrator 202 may determine that one candidate edge tier and edge platform placement has an operating parameter percentage of 100% (i.e., has a processor with two cores), and the remaining candidate edge tier and edge platform placements have an operating parameter percentage of 0% (i.e., do not have a processor with two cores). In some examples, the orchestrator 202 may determine that a candidate edge tier and edge platform placement is the nearest in the edge environment, is available and is the least expensive. As such, the orchestrator 202 may determine an optimal operating parameter percentage that is higher than other optimal operating parameter percentages (e.g., edge tier placements that are not available, more expensive, etc.).

At block 604, the orchestrator 202 selects the edge tier and edge platform placement with the optimal operating parameter percentage as the candidate edge tier and edge platform placement.

At block 606, the orchestrator 202 determines if the operating parameter percentage satisfies a threshold. For example, the orchestrator 202 of the illustrated example selects the edge tier and edge platform placement with the optimal operating parameter percentage (e.g., 70%, largest aggregate of desired operating parameters, etc.) and compares the operating parameter percentage to a threshold (e.g., 75%, 80%, 90%, etc.). If the orchestrator 202 determines that the operating parameter percentage satisfies the threshold, the machine readable instructions 308 proceed to block 608 and the orchestrator 202 implements the workload at the candidate tier edge placement.

If the orchestrator 202 determines that the operating parameter percentage does not satisfy the threshold, the machine readable instructions 308 proceed to block 610 to determine if a number of iterations is below a threshold. For example, each time a request is received and processed by the orchestrator 202 to determine an edge tier and edge platform placement an iteration count is determined. For example, the orchestrator 202 may receive and process a first request and determine a candidate edge tier and edge platform placement during a first iteration. As such, the request would include an iteration count of one. That is, the orchestrator 202 was able to determine an edge tier and edge platform placement that satisfied the SLA attributes of the request during a first iteration. If the orchestrator 202 determines that the number of iterations is not below a threshold (e.g., 5, 8, 12, etc.), the machine readable instructions 308 end. For example, the number of iterations exceeded the threshold due to a cost associated with executing the workload was above a cost function threshold (e.g., the SLA attributes could not be satisfied).

If the orchestrator 202 determines that a number of iterations is below the threshold, the machine readable instructions 308 proceed to block 612 and increase an iteration count.

At block 614, the orchestrator 202 adjust resource requirements and a cost function weight. For example, the orchestrator 202 can adjust the resource requirements by lowering an operating parameter percentage threshold, increase a cost function associated with how much money can be spent to execute the workload at a specific candidate edge tier and edge platform placement, etc. In some examples, the orchestrator 202 increase the amount of money that can be spent to implement a workload at a candidate edge tier and edge platform placement. For example, the orchestrator 202 may update a cost function weight at block 614 (e.g., increase the amount of money that can be spent, increase the amount of resources that can be utilized, increase the amount of edge platforms that can be utilized, etc.) and return to block 602. The machine readable instructions 308 either return to machine readable instructions 300 after implementing a workload, or end when a number of iterations is exceeded.

Figure 7:
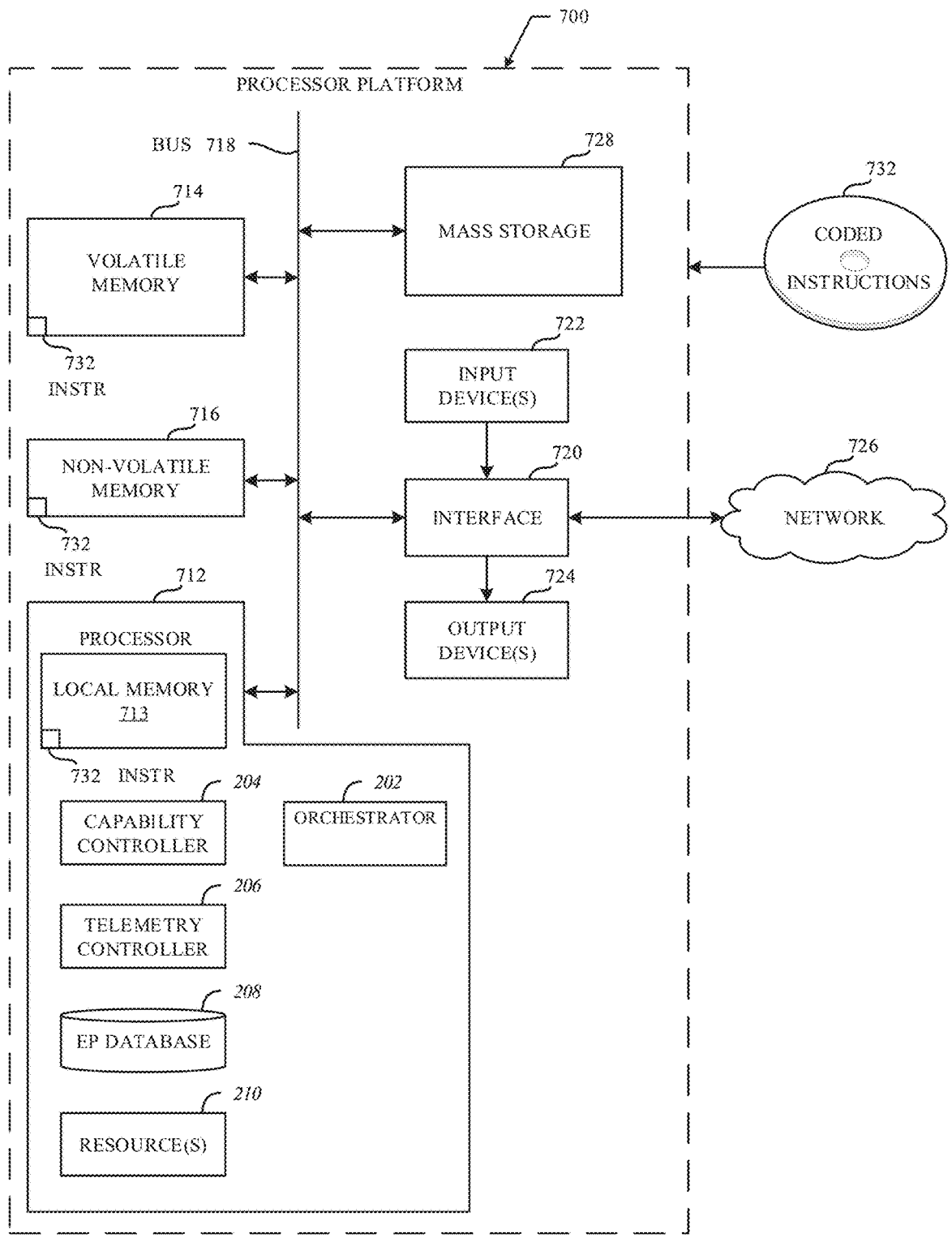
FIG. 7 is a block diagram of an example processing platform structured to execute the instructions of FIG. 3 to implement the orchestrator of FIG. 2.

FIG. 7 is a block diagram of an example processor platform 700 structured to execute the instructions of FIGS. 3-6 to implement the edge platform 200. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example orchestrator 202, the example capability controller 204, the example telemetry controller 206, the example EP database 208, the example resource(s) 210, and/or, more generally, the example edge platform 200.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3-6 may be stored in the mass storage device 728, in the volatile memory 714, in the non-volatile memory 716, and/or on a removable non-transitory computer readable storage medium such as a CD or DVD.

Figure 8:
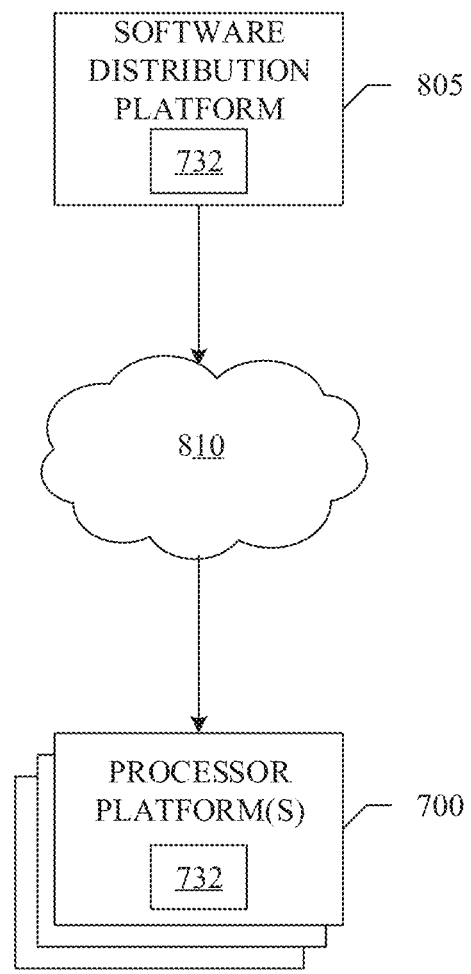
FIG. 8 is a block diagram of an example software distribution platform to distribute software (e.g., software corresponding to the example computer readable instructions of FIGS. 3-6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example computer readable instructions 300 of FIGS. 3-6, as described above. The one or more servers of the example software distribution platform 805 are in communication with a network 810, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions 732 of FIG. 7, may be downloaded to the example processor platform 1000, which is to execute the computer readable instructions 732 to implement the edge platform 200. In some examples, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

Figure 9:
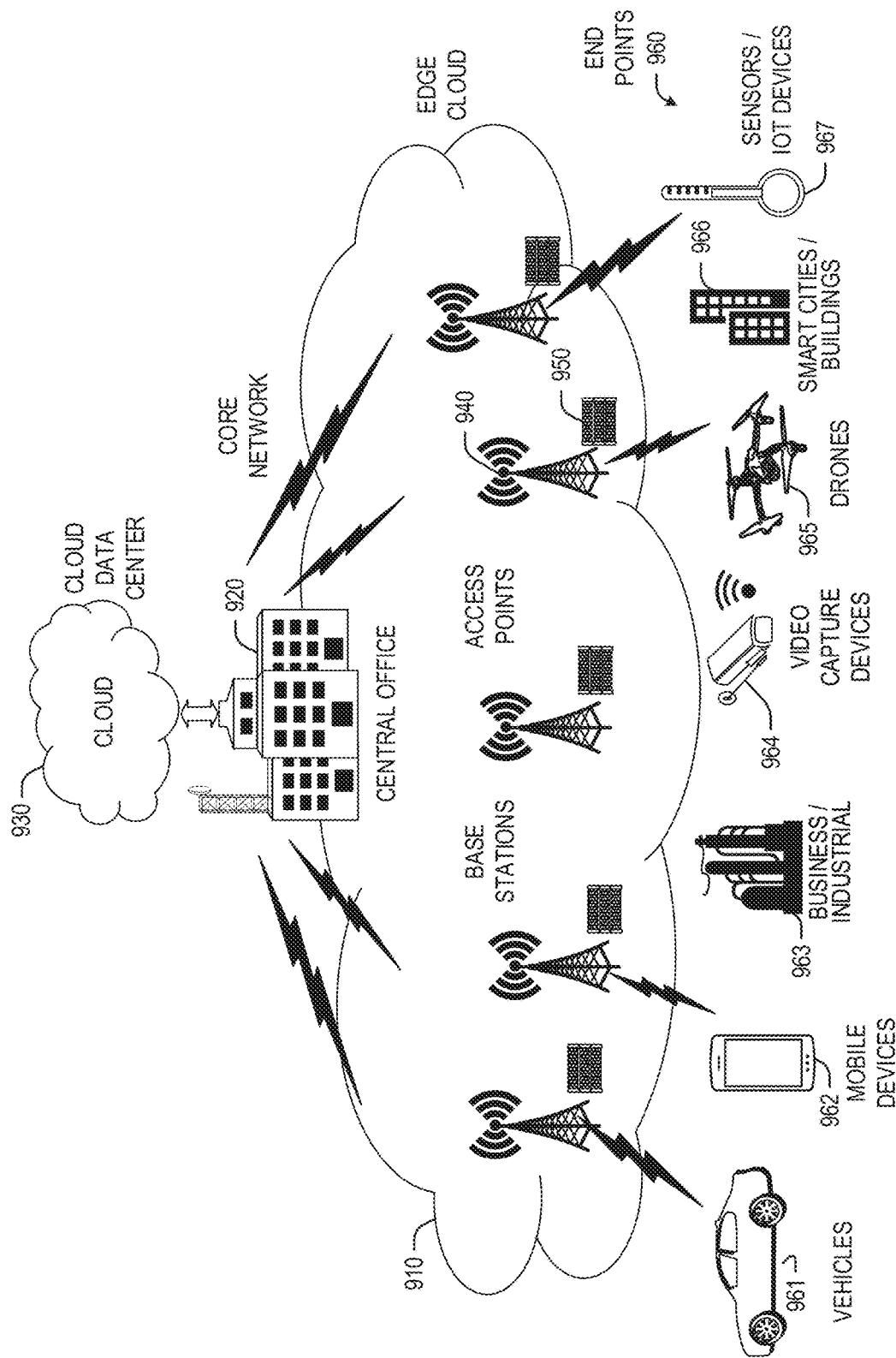
FIG. 9 illustrates an overview of an edge cloud configuration for edge computing in accordance with teachings of this disclosure.

FIG. 9 is a block diagram 900 showing an overview of a configuration for edge computing, which includes a layer of processing referred to in many of the following examples as an "edge cloud". As shown, the edge cloud 910 is co-located at an edge location, such as an access point or base station 940, a local processing hub 950, or a central office 920, and thus may include multiple entities, devices, and equipment instances. The edge cloud 910 is located much closer to the endpoint (consumer and producer) data sources 960 (e.g., autonomous vehicles 961, user equipment 962, business and industrial equipment 963, video capture devices 964, drones 965, smart cities and building devices 966, sensors and IoT devices 967, etc.) than the cloud data center 930. Compute, memory, and storage resources which are offered at the edges in the edge cloud 910 are critical to providing ultra-low latency response times for services and functions used by the endpoint data sources 960 as well as reduce network backhaul traffic from the edge cloud 910 toward cloud data center 930 thus improving energy consumption and overall network usages among other benefits. In some examples, the edge platform 200 can be implemented in the edge cloud 910. In some examples, the edge platform 200 described above in connection with FIGS. 1-8 can be implemented as anyone of the access point or base station 940, the local processing hub 950, the central office 920, the data sources 960 (e.g., autonomous vehicles 961, user equipment 962, business and industrial equipment 963, video capture devices 964, drones 965, smart cities and building devices 966, sensors and IoT devices 967, etc.), or the cloud data center 930. In some examples, the edge platform 200 can be implemented with the examples disclosed in FIGS. 9-15B.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data (e.g., at a "local edge", "close edge", or "near edge"). For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 10:
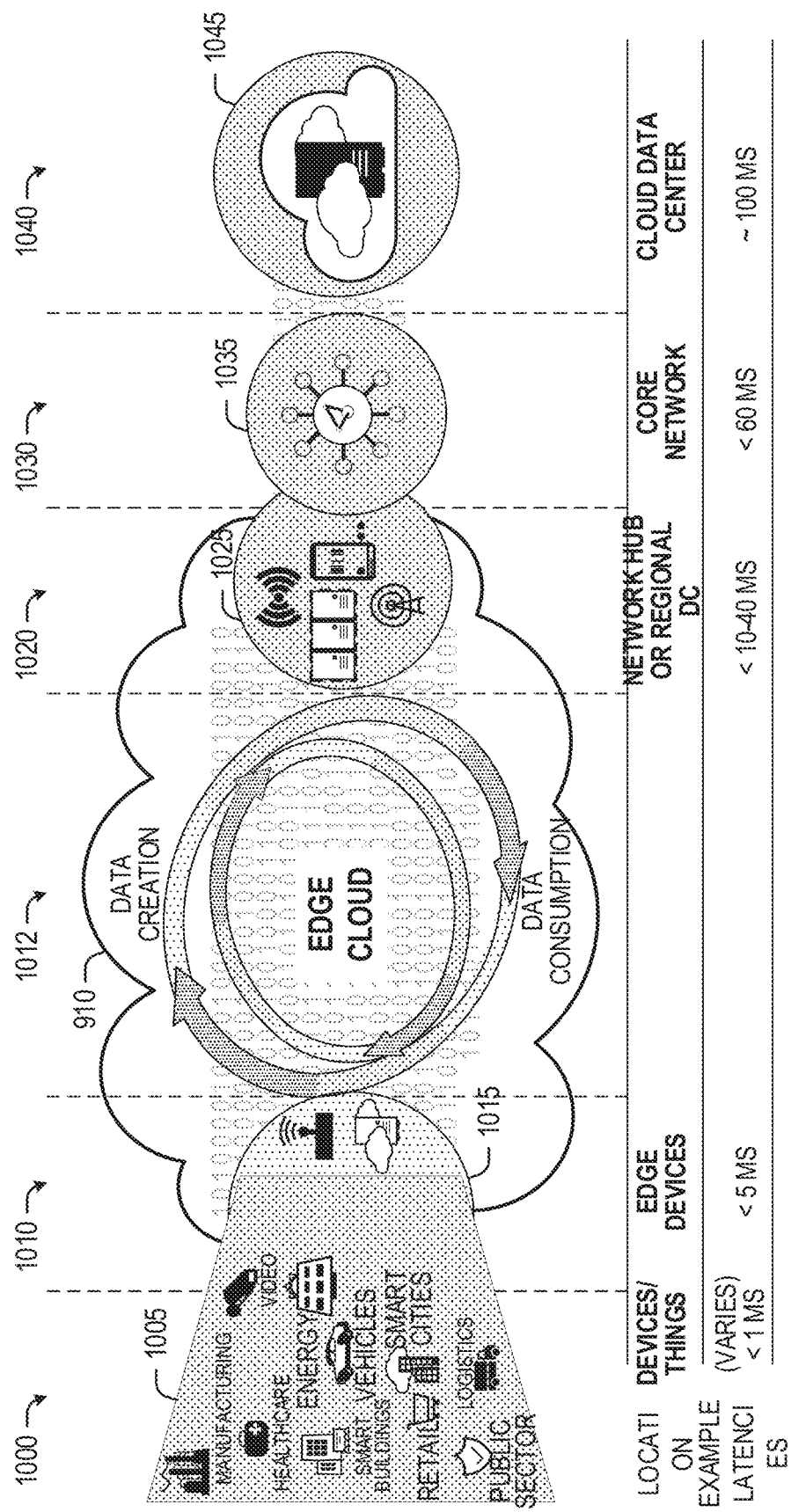
FIG. 10 illustrates operational layers among endpoints, an edge cloud, and cloud computing environments in accordance with teachings of this disclosure.

FIG. 10 illustrates operational layers among endpoints, an edge cloud, and cloud computing environments. Specifically, FIG. 10 depicts examples of computational use cases 1005, utilizing the edge cloud 910 among multiple illustrative layers of network computing. The layers begin at an endpoint (devices and things) layer 1000, which accesses the edge cloud 910 to conduct data creation, analysis, and data consumption activities. The edge cloud 910 may span multiple network layers, such as an edge devices layer 1010 having gateways, on-premise servers, or network equipment (nodes 1015) located in physically proximate edge systems; a network access layer 1020, encompassing base stations, radio processing units, network hubs, regional data centers, or local network equipment (equipment 1025); and any equipment, devices, or nodes located therebetween (in layer 1012, not illustrated in detail). The network communications within the edge cloud 910 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1000, under 5 ms at the edge devices layer 1010 (e.g., a "near edge" or "close edge" layer), to even between 10 to 40 ms when communicating with nodes at the network access layer 1020 (e.g., a "middle edge" layer). Beyond the edge cloud 910 are core network 1030 and cloud data center 1040 layers, each with increasing latency (e.g., between 50-60 ms at the core network layer 1030, to 100 or more ms at the cloud data center layer, both of which may be considered a "far edge" layer). As a result, operations at a core network data center 1035 or a cloud data center 1045, with latencies of at least 50 to 100 ms or more, will not be able to accomplish many time-critical functions of the use cases 1005. Each of these latency values are provided for purposes of illustration and contrast; it will be understood that the use of other access network mediums and technologies may further reduce the latencies.

The various use cases 1005 may access resources under usage pressure from incoming streams, due to multiple services utilizing the edge cloud. To achieve results with low latency, the services executed within the edge cloud 910 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate. In some examples, the costs or penalties of such remediation can be utilized by the orchestrator 202 when determining workload placement by utilizing the remediation as a cost function weight as discussed above in connection with FIGS. 3-6.

Thus, with these variations and service features in mind, edge computing within the edge cloud 910 may provide the ability to serve and respond to multiple applications of the use cases 1005 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.) which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 910 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 910 (network layers 1000-1040), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 910.

As such, the edge cloud 910 is formed from network components and functional features operated by and within edge gateway nodes, edge aggregation nodes, or other edge compute nodes among network layers 1010-1030. The edge cloud 910 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 910 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 910 may be servers, multi-tenant servers, appliance computing devices, and/or any other type of computing devices. For example, the edge cloud 910 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 910 may also include one or more server and/or one or more multi-tenant server. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 11:
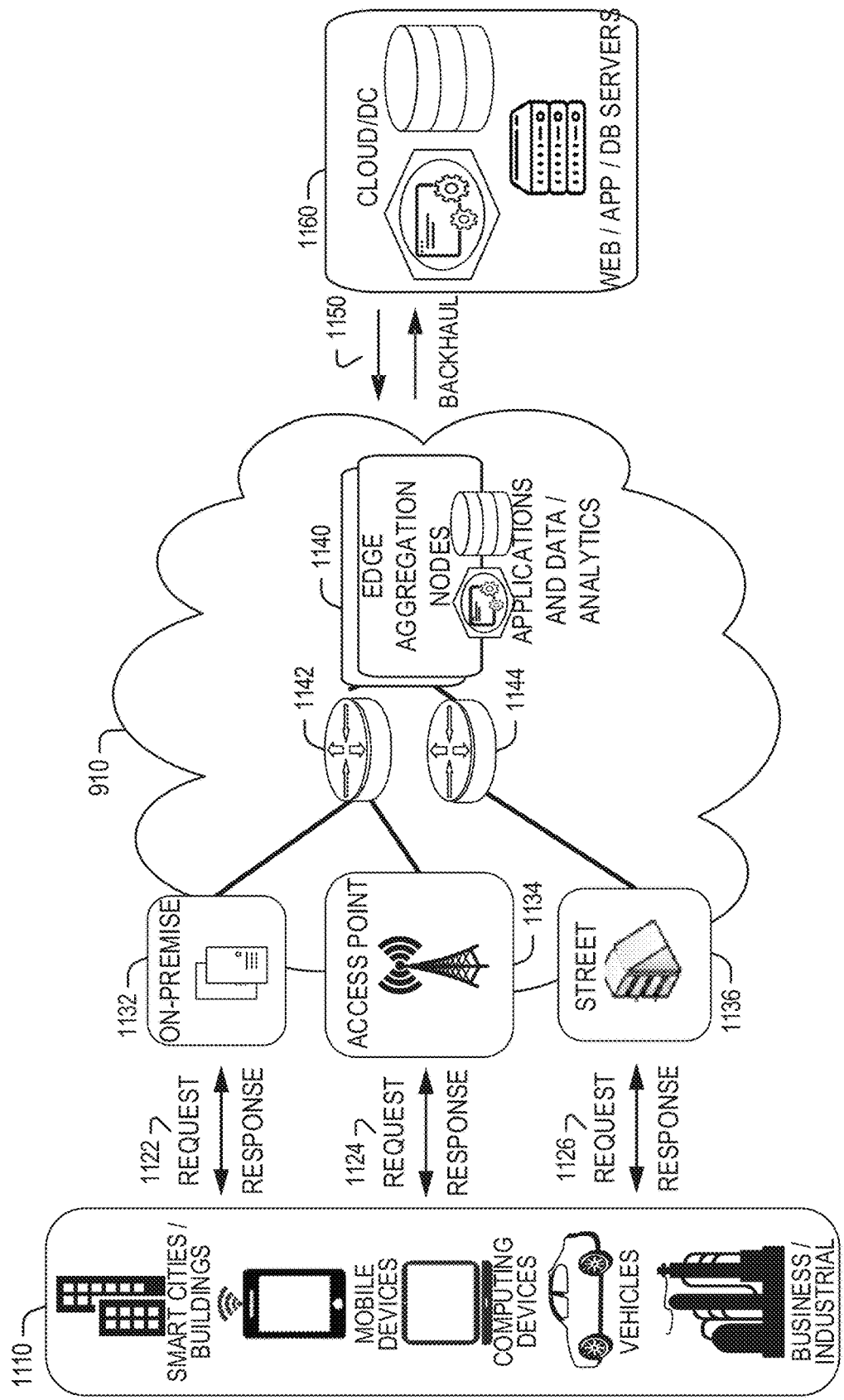
FIG. 11 illustrates a block diagram of an example environment for networking and services in an edge computing system in accordance with teachings of this disclosure.

FIG. 11 illustrates a block diagram of an example environment 1100 in which various client endpoints 1110 (in the form of mobile devices, computers, autonomous vehicles, business computing equipment, industrial processing equipment) exchange requests and responses with the example edge cloud 910. For instance, computers, business computing equipment, and industrial processing equipment may obtain network access via a wired broadband network, by exchanging requests and responses 1122 through an on-premise network system 1132. Mobile computing devices may obtain network access via a wireless broadband network, by exchanging requests and responses 1124 through a cellular network tower 1134. Autonomous vehicles may obtain network access for requests and responses 1126 via a wireless vehicular network through a street-located network system 1136. However, regardless of the type of network access, the TSP may deploy aggregation points 1142, 1144 within the edge cloud 910 to aggregate traffic and requests. Thus, within the edge cloud 910, the TSP may deploy various compute and storage resources, such as at edge aggregation nodes 1140, to provide requested content. The edge aggregation nodes 1140 and other systems of the edge cloud 910 are connected to a cloud or data center 1160, which uses a backhaul network 1150 to fulfill higher-latency requests from a cloud/data center for websites, applications, database servers, etc. (Additional or consolidated instances of the edge aggregation nodes 1140 and the aggregation points 1142, 1144, including those deployed on a single server framework, may also be present within the edge cloud 910 or other areas of the TSP infrastructure).

Figure 12:
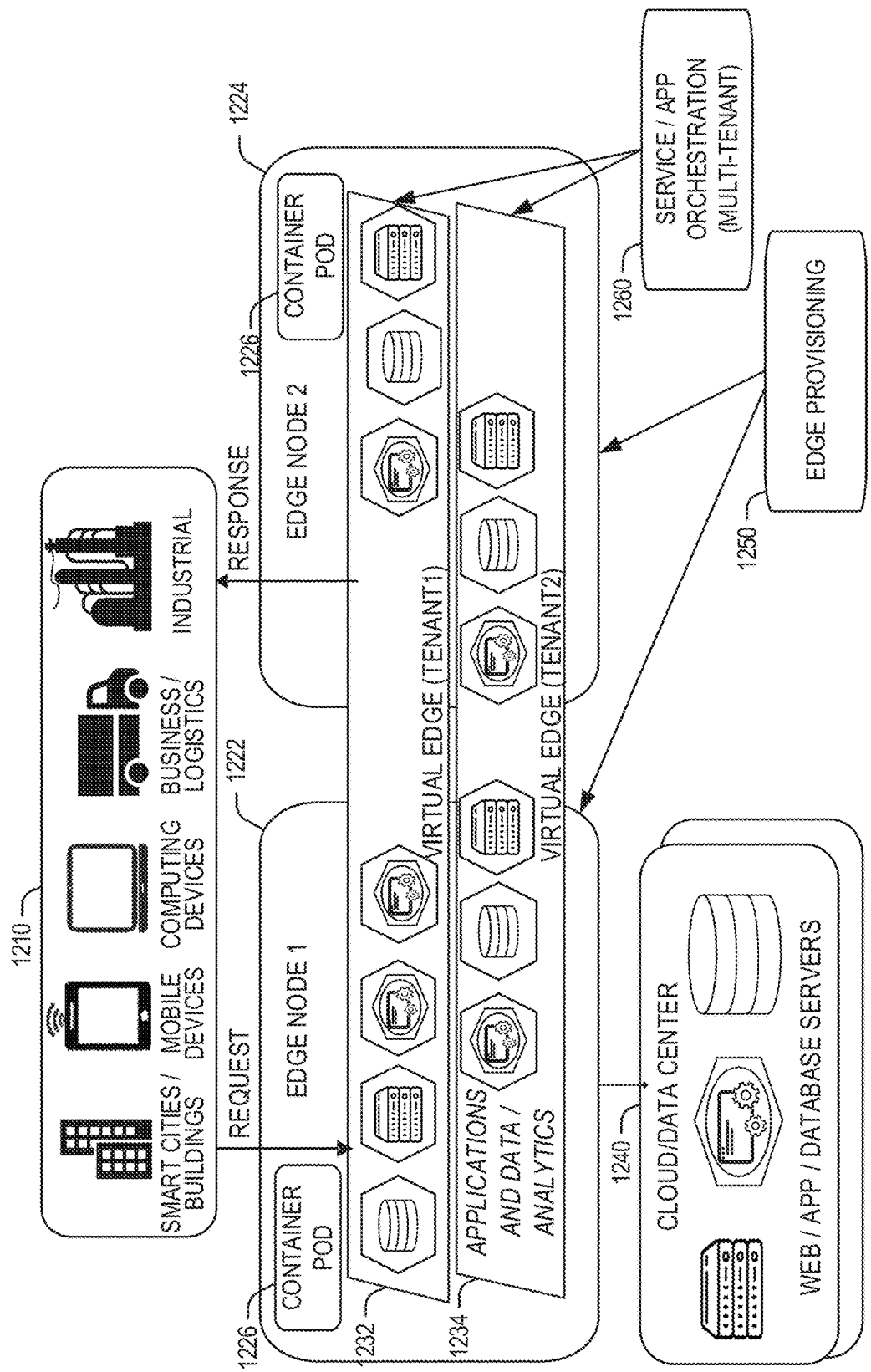
FIG. 12 illustrates deployment of a virtual edge configuration in an edge computing system operated among multiple edge nodes and multiple tenants in accordance with teachings of this disclosure.

FIG. 12 illustrates deployment and orchestration for virtual edge configurations across an edge computing system operated among multiple edge nodes and multiple tenants. Specifically, FIG. 12 depicts coordination of a first edge node 1222 and a second edge node 1224 in an edge computing system 1200, to fulfill requests and responses for various client endpoints 1210 (e.g., smart cities/building systems, mobile devices, computing devices, business/logistics systems, industrial systems, etc.) which access various virtual edge instances. Here, the virtual edge instances provide edge compute capabilities and processing in an edge cloud, with access to a cloud/data center 1240 for higher-latency requests for websites, applications, database servers, etc. However, the edge cloud enables coordination of processing among multiple edge nodes for multiple tenants or entities.

In the example of FIG. 12, these virtual edge instances include: a first virtual edge 1232, offered to a first tenant (Tenant 1), which offers a first combination of edge storage, computing, and services; and a second virtual edge 1234, offering a second combination of edge storage, computing, and services. The virtual edge instances 1232, 1234 are distributed among the edge nodes 1222, 1224, and may include scenarios in which a request and response are fulfilled from the same or different edge nodes. The configuration of the edge nodes 1222, 1224 to operate in a distributed yet coordinated fashion occurs based on edge provisioning functions 1250. The functionality of the edge nodes 1222, 1224 to provide coordinated operation for applications and services, among multiple tenants, occurs based on orchestration functions 1260.

It should be understood that some of the devices in 1210 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1222, 1224 may operate as security feature enforcement points for local resources allocated to multiple tenants per node. Additionally, tenant runtime and application execution (e.g., in instances 1232, 1234) may serve as an enforcement point for a security feature that creates a virtual edge abstraction of resources spanning potentially multiple physical hosting platforms. Finally, the orchestration functions 1260 at an orchestration entity may operate as a security feature enforcement point for marshalling resources along tenant boundaries.

Edge computing nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 1210, 1222, and 1240 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 12. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each of the edge nodes 1222, 1224 may implement the use of containers, such as with the use of a container "pod" 1226, 1228 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1232, 1234 are partitioned according to the needs of each container.

With the use of container pods, a pod controller oversees the partitioning and allocation of containers and resources. The pod controller receives instructions from an orchestrator (e.g., the orchestrator 1260) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1260 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 13:
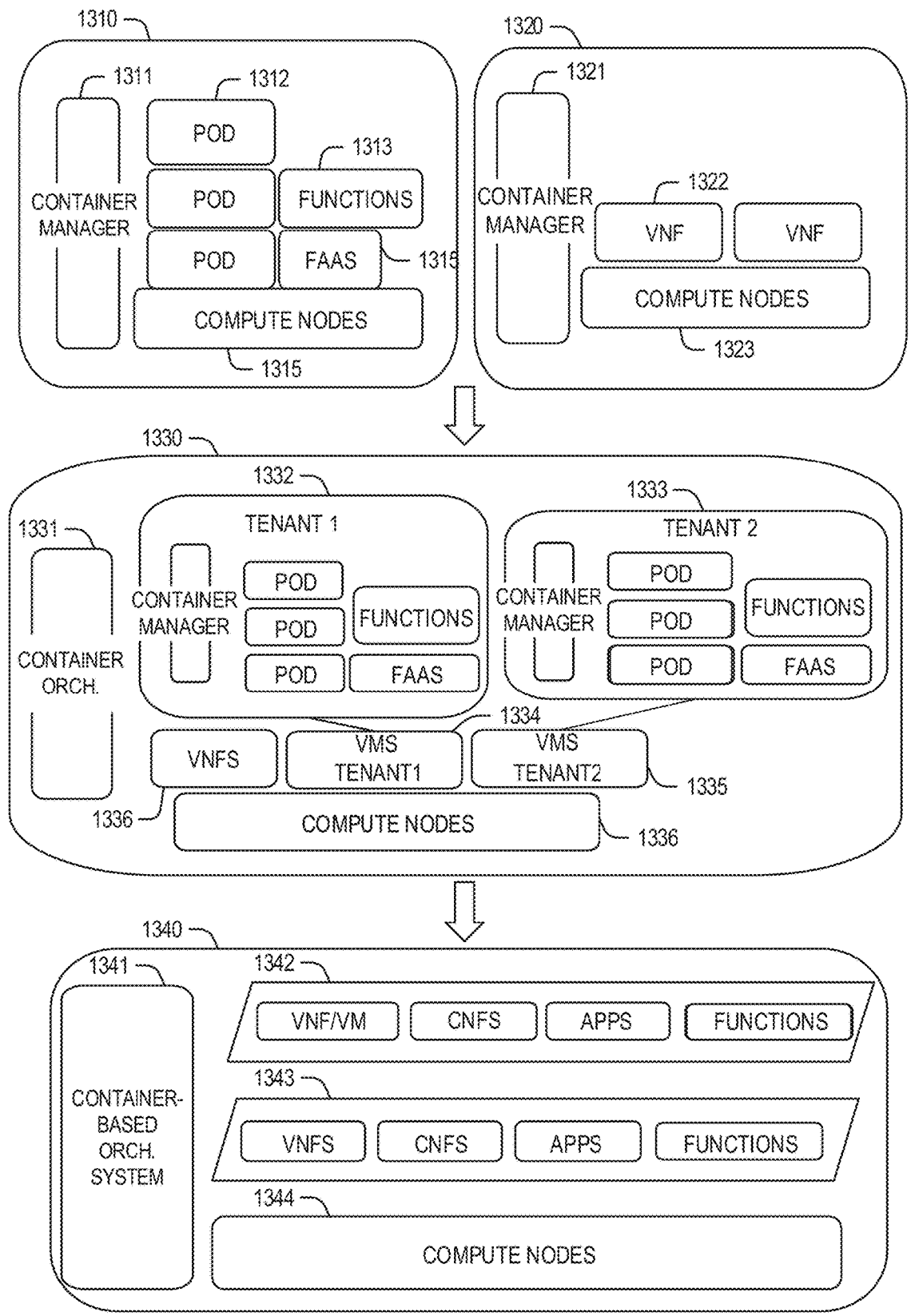
FIG. 13 illustrates various compute arrangements deploying containers in an edge computing system in accordance with teachings of this disclosure.

FIG. 13 illustrates additional compute arrangements deploying containers in an edge computing system. As a simplified example, system arrangements 1310, 1320 depict settings in which a pod controller (e.g., container managers 1311, 1321, 1331) is adapted to launch containerized pods, functions, and functions-as-a-service instances through execution via compute nodes (1315 in arrangement 1310), or to separately execute containerized virtualized network functions through execution via compute nodes (1323 in arrangement 1320). This arrangement is adapted for use of multiple tenants in an example system arrangement 1330 (using compute nodes 1336), where containerized pods (e.g., pods 1312), functions (e.g., functions 1313, VNFs 1322, 1336), and functions-as-a-service instances (e.g., FaaS instance 1315) are launched within virtual machines (e.g., VMs 1334, 1335 for tenants 1332, 1333) specific to respective tenants (aside the execution of virtualized network functions). This arrangement is further adapted for use in system arrangement 1340, which provides containers 1342, 1343, or execution of the various functions, applications, and functions on compute nodes 1344, as coordinated by an container-based orchestration system 1341.

The system arrangements of depicted in FIG. 13 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 13, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 14:
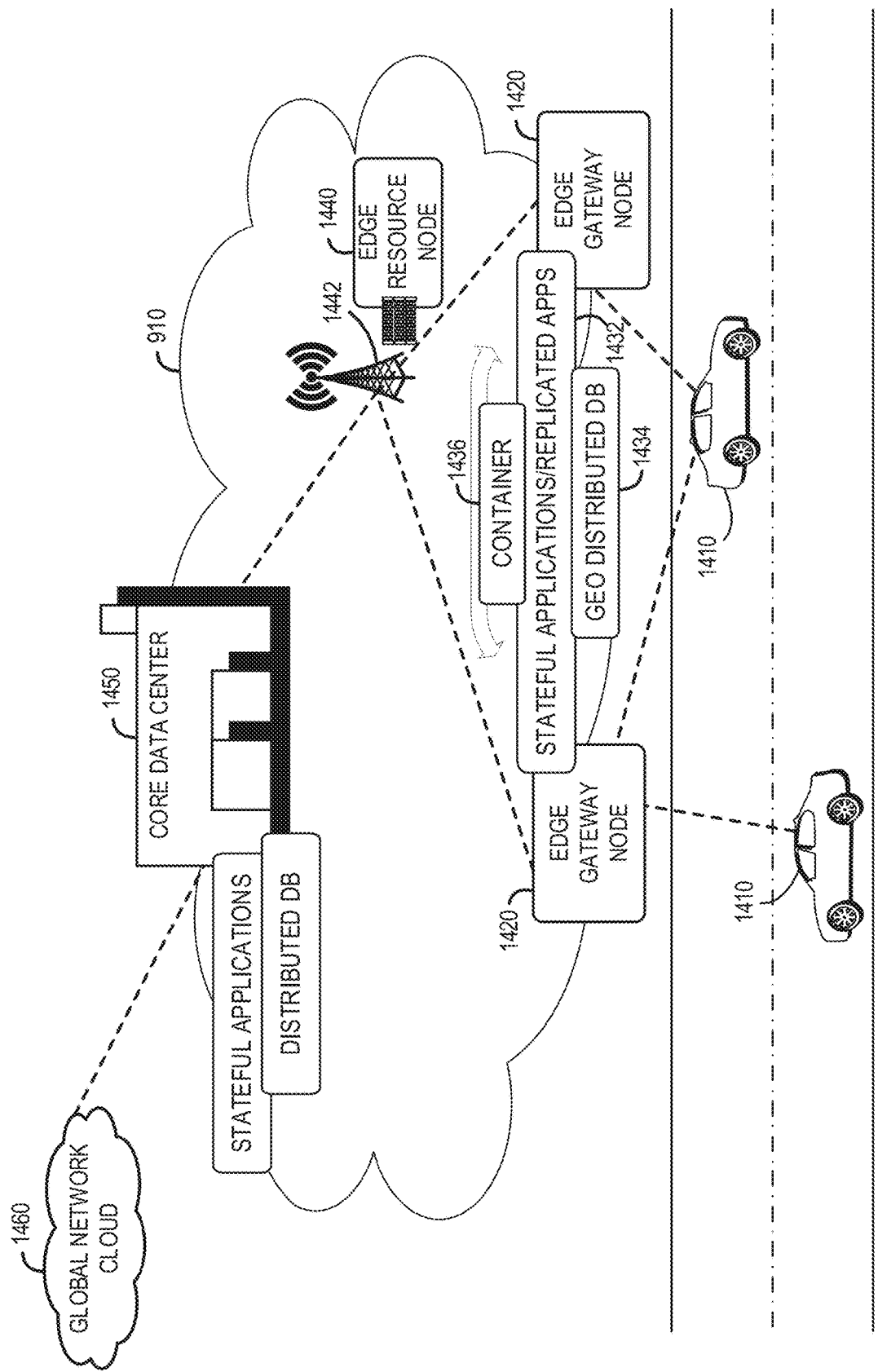
FIG. 14 illustrates an example compute and communication use case involving mobile access to applications in an example edge computing system in accordance with teachings of this disclosure.

It should be appreciated that the edge computing systems and arrangements discussed herein may be applicable in various solutions, services, and/or use cases involving mobility. As an example, FIG. 14 shows an example simplified vehicle compute and communication use case involving mobile access to applications in an example edge computing system 1400 that implements an edge cloud such as the edge cloud 910 of FIG. 9. In this use case, respective client compute nodes 1410 may be embodied as in-vehicle compute systems (e.g., in-vehicle navigation and/or infotainment systems) located in corresponding vehicles which communicate with example edge gateway nodes 1420 during traversal of a roadway. For instance, the edge gateway nodes 1420 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1410 and a particular one of the edge gateway nodes 1420 may propagate so as to maintain a consistent connection and context for the example client compute node 1410. Likewise, mobile edge nodes may aggregate at the high priority services or according to the throughput or latency resolution requirements for the underlying service(s) (e.g., in the case of drones). The respective edge gateway nodes 1420 include an amount of processing and storage capabilities and, as such, some processing and/or storage of data for the client compute nodes 1410 may be performed on one or more of the edge gateway nodes 1420.

The edge gateway nodes 1420 may communicate with one or more edge resource nodes 1440, which are illustratively embodied as compute servers, appliances or components located at or in a communication base station 1442 (e.g., a based station of a cellular network). As discussed above, the respective edge resource node(s) 1440 include an amount of processing and storage capabilities and, as such, some processing and/or storage of data for the client compute nodes 1410 may be performed on the edge resource node(s) 1440. For example, the processing of data that is less urgent or important may be performed by the edge resource node 1440, while the processing of data that is of a higher urgency or importance may be performed by the edge gateway devices 1420 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1440 also communicate with the core data center 1450, which may include compute servers, appliances, and/or other components located in a central location (e.g., a central office of a cellular communication network). The example core data center 1450 may provide a gateway to the global network cloud 1460 (e.g., the Internet) for the edge cloud 910 operations formed by the edge resource node(s) 1440 and the edge gateway devices 1420. Additionally, in some examples, the core data center 1450 may include an amount of processing and storage capabilities and, as such, some processing and/or storage of data for the client compute devices may be performed on the core data center 1450 (e.g., processing of low urgency or importance, or high complexity).

The edge gateway nodes 1420 or the edge resource node(s) 1440 may offer the use of stateful applications 1432 and a geographic distributed database 1434. Although the applications 1432 and database 1434 are illustrated as being horizontally distributed at a layer of the edge cloud, it will be understood that resources, services, or other components of the application may be vertically distributed throughout the edge cloud (including, part of the application executed at the client compute node 1410, other parts at the edge gateway nodes 1420 or the edge resource node(s) 1440, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1436 (or pod of containers) may be flexibly migrated from one of the edge nodes 1420 to other edge nodes (e.g., another one of edge nodes 1420, one of the edge resource node(s) 1440, 1450, 1460, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 1440 may differ from the hardware at the edge gateway nodes 1420 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 14 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1420, some others at the edge resource node(s) 1440, and others in the core data center 1450 or global network cloud 1460.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1400 can include or be in communication with an edge provisioning node 1444. The edge provisioning node 1444 can distribute software such as the example computer readable instructions 1582 of FIG. 15B, to various receiving parties for implementing any of the methods described herein. The example edge provisioning node 1444 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 1444 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 1444. For example, the entity that owns and/or operates the edge provisioning node 1444 may be a developer, a seller, and/or a licensor (or a customer and/or consumer thereof) of software instructions such as the example computer readable instructions 1582 of FIG. 15B. The receiving parties may be consumers, service providers, users, retailers, OEMs, etc., who purchase and/or license the software instructions for use and/or re-sale and/or sub-licensing.

In an example, edge provisioning node 1444 includes one or more servers and one or more storage devices. The storage devices host computer readable instructions such as the example computer readable instructions 1582 of FIG. 15B, as described below. Similarly to edge gateway devices 1420 described above, the one or more servers of the edge provisioning node 1444 are in communication with a base station 1442 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 1582 from the edge provisioning node 1444. For example, the software instructions, which may correspond to the example computer readable instructions 1582 of FIG. 15B, may be downloaded to the example processor platform/s, which is to execute the computer readable instructions 1582 to implement the methods described herein.

In some examples, the processor platform(s) that execute the computer readable instructions 1582 can be physically located in different geographic locations, legal jurisdictions, etc. In some examples, one or more servers of the edge provisioning node 1444 periodically offer, transmit, and/or force updates to the software instructions (e.g., the example computer readable instructions 1582 of FIG. 15B) to ensure improvements, patches, updates, etc. are distributed and applied to the software instructions implemented at the end user devices. In some examples, different components of the computer readable instructions 1582 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 15A and 15B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

FIG. 15A is a block diagram of an example implementation of an example edge compute node 1500 that includes a compute engine (also referred to herein as "compute circuitry") 1502, an input/output (I/O) subsystem 1508, data storage 1510, a communication circuitry subsystem 1512, and, optionally, one or more peripheral devices 1514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 1500 of FIG. 15 may be deployed in one of the edge computing systems illustrated in FIGS. 9-12 and/or 14 to implement any edge compute node of examples disclosed herein.

The compute node 1500 may be embodied as any type of engine, device, or collection of devices capable of performing various compute functions. In some examples, the compute node 1500 may be embodied as a single device such as an integrated circuit, an embedded system, a field-programmable gate array (FPGA), a system-on-a-chip (SOC), or other integrated system or device. In the illustrative example, the compute node 1500 includes or is embodied as a processor 1504 and a memory 1506. The processor 1504 may be embodied as any type of processor capable of performing the functions described herein (e.g., executing an application). For example, the processor 1504 may be embodied as a multi-core processor(s), a microcontroller, a processing unit, a specialized or special purpose processing unit, or other processor or processing/controlling circuit.

In some examples, the processor 1504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1504 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 1500.

The main memory 1506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1506 may be integrated into the processor 1504. The main memory 1506 may store various software and data used during operation such as one or more applications, data operated on by the application(s), libraries, and drivers.

The compute circuitry 1502 is communicatively coupled to other components of the compute node 1500 via the I/O subsystem 1508, which may be embodied as circuitry and/or components to facilitate input/output operations with the compute circuitry 1502 (e.g., with the processor 1504 and/or the main memory 1506) and other components of the compute circuitry 1502. For example, the I/O subsystem 1508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1508 may form a portion of a system-on-a-chip (SoC) and be incorporated, along with one or more of the processor 1504, the main memory 1506, and other components of the compute circuitry 1502, into the compute circuitry 1502.

The one or more illustrative data storage devices 1510 may be embodied as any type of devices configured for short-term or long-term storage of data such as, for example, memory devices and circuits, memory cards, hard disk drives, solid-state drives, or other data storage devices. Individual data storage devices 1510 may include a system partition that stores data and firmware code for the data storage device 1510. Individual data storage devices 1510 may also include one or more operating system partitions that store data files and executables for operating systems depending on, for example, the type of compute node 1500.

The communication circuitry 1512 may be embodied as any communication circuit, device, or collection thereof, capable of enabling communications over a network between the compute circuitry 1502 and another compute device (e.g., an edge gateway of an implementing edge computing system). The communication circuitry 1512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1512 includes a network interface controller (NIC) 1520, which may also be referred to as a host fabric interface (HFI). The NIC 1520 may be embodied as one or more add-in-boards, daughter cards, network interface cards, controller chips, chipsets, or other devices that may be used by the compute node 1500 to connect with another compute device (e.g., an edge gateway node). In some examples, the NIC 1520 may be embodied as part of a system-on-a-chip (SoC) that includes one or more processors, or included on a multichip package that also contains one or more processors. In some examples, the NIC 1520 may include a local processor (not shown) and/or a local memory (not shown) that are both local to the NIC 1520. In such examples, the local processor of the NIC 1520 may be capable of performing one or more of the functions of the compute circuitry 1502 described herein. Additionally, or alternatively, in such examples, the local memory of the NIC 1520 may be integrated into one or more components of the client compute node at the board level, socket level, chip level, and/or other levels.

Additionally, in some examples, a respective compute node 1500 may include one or more peripheral devices 1514. Such peripheral devices 1514 may include any type of peripheral device found in a compute device or server such as audio input devices, a display, other input/output devices, interface devices, and/or other peripheral devices, depending on the particular type of the compute node 1500. In further examples, the compute node 1500 may be embodied by a respective edge compute node (whether a client, gateway, or aggregation node) in an edge computing system or like forms of appliances, computers, subsystems, circuitry, or other components.

Figure 15B:
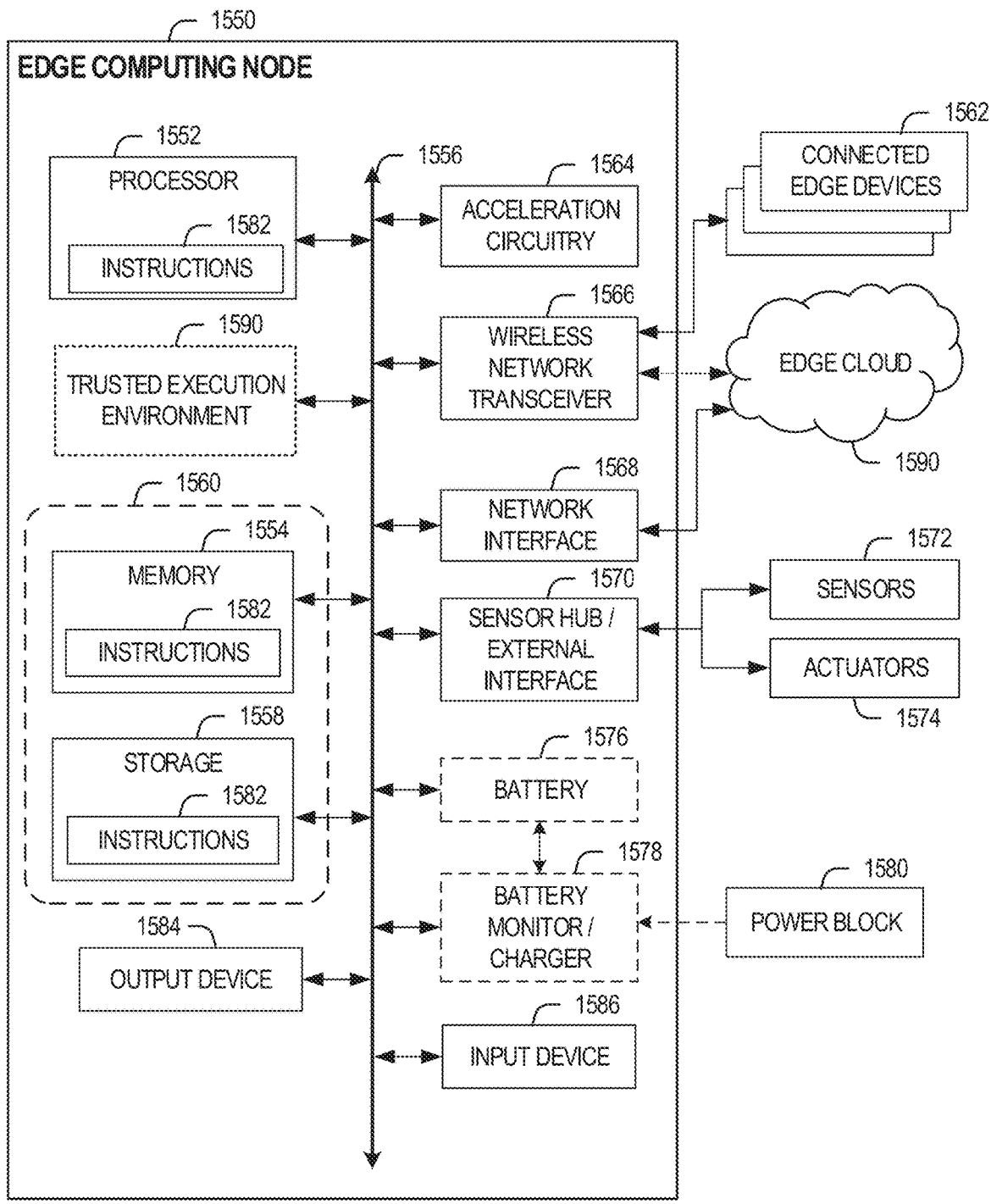
FIG. 15B is another block diagram of an example implementation of an example compute node that may be deployed in one of the edge computing systems illustrated in FIGS. 9-12 and/or 14 in accordance with teachings of this disclosure.

In a more detailed example, FIG. 15B illustrates a block diagram of an example edge computing node 1550 structured to execute the instructions of FIGS. 3-6 to implement the techniques (e.g., operations, processes, methods, and methodologies) described herein such as the edge platform 200 of FIG. 2. This edge computing node 1550 provides a closer view of the respective components of node 1500 when implemented as or as part of a computing device (e.g., as a mobile device, a base station, server, gateway, etc.). The edge computing node 1550 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1550, or as components otherwise incorporated within a chassis of a larger system. For example, the edge computing node 1550 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 1550 may include processing circuitry in the form of a processor 1552, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1552 may be a part of a system on a chip (SoC) in which the processor 1552 and other components are formed into a single integrated circuit, or a single package, such as the Edison™ or Galileo™ SoC boards from Intel Corporation, Santa Clara, California. As an example, the processor 1552 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1552 and accompanying circuitry may be provided in a single socket form factor, multiple socket form factor, or a variety of other formats, including in limited hardware configurations or configurations that include fewer than all elements shown in FIG. 15. In this example, the processor 1552 implements the example orchestrator 202, the example capability controller 204, the example telemetry controller 206, the example EP database 208, the example resource(s) 210, and/or, more generally, the example edge platform 200.

The processor 1552 may communicate with a system memory 1554 over an interconnect 1556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others. 8922

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in an SoC based system. Other bus systems may be included, such as an I2C interface, an SPI interface, point to point interfaces, and a power bus, among others.

The interconnect 1556 may couple the processor 1552 to a transceiver 1566, for communications with the connected edge devices 1562. The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the edge computing node 1550 may communicate with close devices, e.g., within about 10 meters, using a local transceiver based on BLE, or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1590 via local or wide area network protocols. The wireless network transceiver 1566 may be an LPWA transceiver that follows the IEEE 802.15.4, or IEEE 802.15.4 g standards, among others. The edge computing node 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1568 may be included to provide a wired communication to nodes of the edge cloud 1590 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, etc.) may be embodied by such communications circuitry.

The edge computing node 1550 may include or be coupled to acceleration circuitry 1564, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1556 may couple the processor 1552 to a sensor hub or external interface 1570 that is used to connect additional devices or subsystems. The devices may include sensors 1572, such as accelerometers, level sensors, flow sensors, optical light sensors, camera sensors, temperature sensors, global navigation system (e.g., GPS) sensors, pressure sensors, barometric pressure sensors, and the like. The hub or interface 1570 further may be used to connect the edge computing node 1550 to actuators 1574, such as power switches, valve actuators, an audible sound generator, a visual warning device, and the like.

In some optional examples, various input/output (I/O) devices may be present within or connected to, the edge computing node 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1550. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the edge computing node 1550, although, in examples in which the edge computing node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the edge computing node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the edge computing node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the edge computing node 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine-readable medium 1560 including code to direct the processor 1552 to perform electronic operations in the edge computing node 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 1582 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed for workload placement in an edge environment. The disclosed methods, apparatus and articles of manufacture improve the efficiency of using a computing device by adjusting the computation resources expended on orchestrating requests to execute workloads at an workload based on the available power and/or thermal levels of the edge platform. The disclosed methods, apparatus and articles of manufacture are accordingly directed to one or more improvement(s) in the functioning of a computer.

Further examples and combinations thereof include the following: example 1 includes an apparatus comprising an orchestrator to receive a request to execute a workload from an edge platform within an edge environment, and a capability controller to analyze the request to determine operating parameters for the workload from the edge platform, and analyze candidate edge tier and edge platform placements based on the operating parameters, the orchestrator to determine a candidate edge tier and edge platform placement for the workload based on a candidate edge tier and edge platform placement that satisfies the operating parameters.

Example 2 includes the apparatus of example 1, wherein the capability controller is to derive a subset of factors required for the operating parameters when determining of the operating parameters.

Example 3 includes the apparatus of any one or more of examples 1 or 2, wherein the subset of factors includes service level agreement (SLA) attributes of the edge platform.

Example 4 includes the apparatus of any one or more of examples 1-3, wherein the subset of factors includes at least one of a level of security, a level of accuracy, dependencies of the edge platform on other microservices, a location of the dependencies within the edge environment, or usage information of the edge platform.

Example 5 includes the apparatus of any one or more of examples 1-4, wherein the capability controller is to estimate resource requirements for the edge platform, the resource requirements including power measurements, thermal measurements, latency measurements, and bandwidth measurements for the workload based on the subset of factors.

Example 6 includes the apparatus of any one or more of examples 1-5, wherein the capability controller is to update the resource requirements based on updated operating parameters.

Example 7 includes the apparatus of any one or more of examples 1-6, wherein the orchestrator is to receive telemetry data from each of the candidate edge tier and edge platform placements.

Example 8 includes the apparatus of any one or more of examples 1-7, wherein the capability controller is to determine resource availabilities of each of the candidate edge tier and edge platform placements, the resource availabilities corresponding to power availability, thermal availability, latency availability and bandwidth availability at each of the candidate edge tier and edge platform placements based on the telemetry data.

Example 9 includes the apparatus of any one or more of examples 1-8, wherein the orchestrator is to determine an operating parameter percentage for each of the candidate edge tier and edge platform placements, the operating parameter percentage corresponding to a percentage of the resource availabilities of an edge tier and edge platform placement that satisfy the resource requirements of the edge platform, select the edge tier and edge platform placement with the optimal operating parameter percentage as the candidate edge tier and edge platform placement, and implement the workload at the candidate edge tier and edge platform placement.

Example 10 includes the apparatus of any one or more of examples 1-9, wherein the orchestrator is to, in response to the operating parameter percentages for each of the candidate edge tier and edge platform placements not satisfying a threshold, adjust resource requirements and a cost function weight.

Example 11 includes an apparatus comprising means for orchestrating to receive a request to execute a workload from an edge platform within an edge environment, and means for controlling capability to analyze the request to determine operating parameters for the workload from the edge platform, and analyze candidate edge tier and edge platform placements based on the operating parameters, and the orchestrating means to determine a candidate edge tier and edge platform placement for the workload based on a candidate edge tier and edge platform placement that satisfies the operating parameters.

Example 12 includes the apparatus of example 11, wherein the capability controlling means is to derive a subset of factors required for the operating parameters when determining of the operating parameters.

Example 13 includes the apparatus of any one or more of examples 11 or 12, wherein the subset of factors includes service level agreement (SLA) attributes of the edge platform.

Example 14 includes the apparatus of any one or more of examples 11-13, wherein the subset of factors includes at least one of a level of security, a level of accuracy, dependencies of the edge platform on other microservices, a location of the dependencies within the edge environment, or usage information of the edge platform.

Example 15 includes the apparatus of any one or more of examples 11-14, wherein the capability controlling means is to estimate resource requirements for the edge platform, the resource requirements including power measurements, thermal measurements, latency measurements and bandwidth measurements for the workload based on the subset of factors.

Example 16 includes the apparatus of any one or more of examples 11-15, wherein the capability controlling means is to update the resource requirements based on updated operating parameters.

Example 17 includes the apparatus of any one or more of examples 11-16, wherein the orchestrating means is to receive telemetry data from each of the candidate edge tier and edge platform placements.

Example 18 includes the apparatus of any one or more of examples 11-17, wherein the capability controlling means is to determine resource availabilities of each of the candidate edge tier and edge platform placements, the resource availabilities corresponding to power availability, thermal availability, latency availability and bandwidth availability at each of the candidate edge tier and edge platform placements based on the telemetry data.

Example 19 includes the apparatus of any one or more of examples 11-18, wherein the orchestrating means is to determine an operating parameter percentage for each of the candidate edge tier and edge platform placements, the operating parameter percentage corresponding to a percentage of the resource availabilities of an edge tier and edge platform placement that satisfy the resource requirements of the edge platform, select the edge tier and edge platform placement with the optimal operating parameter percentage as the candidate edge tier and edge platform placement, and implement the workload at the candidate edge tier and edge platform placement.

Example 20 includes the apparatus of any one or more of examples 11-19, wherein the orchestrating means is to, in response to the operating parameter percentages for each of the candidate edge tier and edge platform placements not satisfying a threshold, adjust resource requirements and a cost function weight.

Example 21 includes a non-transitory computer readable medium comprising data which may be configured into executable instructions and, when configured and executed, cause at least one processor to at least access a request to execute a workload from an edge platform within an edge environment, analyze the request to determine operating parameters for the workload from the edge platform, analyze candidate edge tier and edge platform placements based on the operating parameters, and determine a candidate edge tier and edge platform placement for the workload based on a candidate edge tier and edge platform placement that satisfies the operating parameters.

Example 22 includes the non-transitory computer readable medium of example 21, wherein the instructions, when configured and executed, cause the at least one processor to derive a subset of factors required for the operating parameters when determining of the operating parameters.

Example 23 includes the non-transitory computer readable medium of any one or more of examples 21 or 22, wherein the subset of factors includes service level agreement (SLA) attributes of the edge platform.

Example 24 includes the non-transitory computer readable medium of any one or more of examples 21-23, wherein the subset of factors includes at least one of a level of security, a level of accuracy, dependencies of the edge platform on other microservices, a location of the dependencies within the edge environment, or usage information of the edge platform.

Example 25 includes the non-transitory computer readable medium of any one or more of examples 21-24, wherein the instructions, when configured and executed, cause the at least one processor to estimate resource requirements for the edge platform, the resource requirements including power measurements, thermal measurements, latency measurements, and bandwidth measurements for the workload based on the subset of factors.

Example 26 includes the non-transitory computer readable medium of any one or more of examples 21-25, wherein the instructions, when configured and executed, cause the at least one processor to update the resource requirements based on updated operating parameters.

Example 27 includes the non-transitory computer readable medium of any one or more of examples 21-26, wherein the instructions, when configured and executed, cause the at least one processor to receive telemetry data from each of the candidate edge tier and edge platform placements.

Example 28 includes the non-transitory computer readable medium of any one or more of examples 21-27, wherein the instructions, when configured and executed, cause the at least one processor to determine resource availabilities of each of the candidate edge tier and edge platform placements, the resource availabilities corresponding to power availability, thermal availability, latency availability and bandwidth availability at each of the candidate edge tier and edge platform placements based on the telemetry data.

Example 29 includes the non-transitory computer readable medium of any one or more of examples 21-28, wherein the instructions, when configured and executed, cause the at least one processor to determine an operating parameter percentage for each of the candidate edge tier and edge platform placements, the operating parameter percentage corresponding to a percentage of the resource availabilities of an edge tier and edge platform placement that satisfy the resource requirements of the edge platform, select the edge tier and edge platform placement with the optimal operating parameter percentage as the candidate edge tier and edge platform placement, and implement the workload at the candidate edge tier and edge platform placement.

Example 30 includes the non-transitory computer readable medium of any one or more of examples 21-29, wherein the instructions, when configured and executed, cause the at least one processor to adjust resource requirements and a cost function weight in response to the operating parameter percentages for each of the candidate edge tier and edge platform placements not satisfying a threshold.

Example 31 includes a method comprising receiving a request to execute a workload from an edge platform within an edge environment, analyzing the request to determine operating parameters for the workload from the edge platform, analyzing candidate edge tier and edge platform placements based on the operating parameters, and determining a candidate edge tier and edge platform placement for the workload based on a candidate edge tier and edge platform placement that satisfies the operating parameters.

Example 32 includes the method of example 31, wherein the determining of the operating parameters further includes deriving a subset of factors required for the operating parameters.

Example 33 includes the method of any one or more of examples 31 or 32, wherein the subset of factors includes service level agreement (SLA) attributes of the edge platform.

Example 34 includes the method of any one or more of examples 31-33, wherein the subset of factors includes at least one of a level of security, a level of accuracy, dependencies of the edge platform on other microservices, a location of the dependencies within the edge environment, or usage information of the edge platform.

Example 35 includes the method of any one or more of examples 31-34, wherein the determining of the operating parameters includes estimating resource requirements for the edge platform, the resource requirements including power measurements, thermal measurements, latency measurements, and bandwidth measurements for the workload based on the subset of factors.

Example 36 includes the method of any one or more of examples 31-35, further including updating the resource requirements based on updated operating parameters.

Example 37 includes the method of any one or more of examples 31-36, further including receiving telemetry data from each of the candidate edge tier and edge platform placements.

Example 38 includes the method of any one or more of examples 31-37, wherein the analyzing of the candidate edge tier and edge platform placements includes determining resource availabilities of each of the candidate edge tier and edge platform placements, the resource availabilities corresponding to power availability, thermal availability, latency availability, and bandwidth availability at each of the candidate edge tier and edge platform placements based on the telemetry data.

Example 39 includes the method of any one or more of examples 31-38, wherein the determining of the candidate edge tier and edge platform placement for the edge platform includes determining an operating parameter percentage for each of the candidate edge tier and edge platform placements, the operating parameter percentage corresponding to a percentage of the resource availabilities of an edge tier and edge platform placement that satisfy the resource requirements of the edge platform, selecting the edge tier and edge platform placement with the optimal operating parameter percentage as the candidate edge tier and edge platform placement, and implementing the workload at the candidate edge tier and edge platform placement.

Example 40 includes the method of any one or more of examples 31-39, further including, in response to the operating parameter percentages for each of the candidate edge tier and edge platform placements not satisfying a threshold, adjusting resource requirements and a cost function weight.

Example 41 is a non-transitory computer readable medium comprising instructions to perform any of examples 31-40.

Example 42 is an edge computing gateway, comprising processing circuitry to perform any of examples 31-40.

Example 43 includes a method comprising receiving a request to execute a cloudlet within an edge environment, analyzing the request to determine operating parameters for the cloudlet, analyzing candidate edge tier and edge platform placements based on the operating parameters, and determining a candidate edge tier and edge platform placement for the cloudlet based on a candidate edge tier and edge platform placement that satisfies the operating parameters.

Example 44 includes the method of example 43, wherein the determining of the operating parameters further includes deriving a subset of factors required for the operating parameters.

Example 45 includes the method of any one or more of examples 43 or 44, wherein the subset of factors includes service level agreement (SLA) attributes of the cloudlet.

Example 46 includes the method of any one or more of examples 43-45, wherein the subset of factors includes at least one of a level of security, a level of accuracy, dependencies of the cloudlet on other microservices, a location of the dependencies within the edge environment, or usage information of the cloudlet.

Example 47 includes the method of any one or more of examples 43-46, wherein the determining of the operating parameters includes estimating resource requirements for the cloudlet, the resource requirements including power measurements, thermal measurements, latency measurements, and bandwidth measurements for the cloudlet based on the subset of factors.

Example 48 includes the method of any one or more of examples 43-47, further including updating the resource requirements based on updated operating parameters.

Example 49 includes the method of any one or more of examples 43-48, further including receiving telemetry data from each of the candidate edge tier and edge platform placements.

Example 50 includes the method of any one or more of examples 43-49, wherein the analyzing of the candidate edge tier and edge platform placements includes determining resource availabilities of each of the candidate edge tier and edge platform placements, the resource availabilities corresponding to power availability, thermal availability, latency availability, and bandwidth availability at each of the candidate edge tier and edge platform placements based on the telemetry data.

Example 51 includes the method of any one or more of examples 43-50, wherein the determining of the candidate edge tier and edge platform placement for the cloudlet includes determining an operating parameter percentage for each of the candidate edge tier and edge platform placements, the operating parameter percentage corresponding to a percentage of the resource availabilities of an edge tier and edge platform placement that satisfy the resource requirements of the cloudlet, selecting the edge tier and edge platform placement with the optimal operating parameter percentage as the candidate edge tier and edge platform placement, and implementing the cloudlet at the candidate edge tier and edge platform placement.

Example 52 includes the method of any one or more of examples 43-51, further including, in response to the operating parameter percentages for each of the candidate edge tier and edge platform placements not satisfying a threshold, adjusting resource requirements and a cost function weight.

Example 53 is a non-transitory computer readable medium comprising instructions to perform any of examples 43-52.

Example 54 is an edge computing gateway, comprising processing circuitry to perform any of examples 43-52.

Example 55 includes a method comprising receiving a request to execute a cloudlet within an edge environment, analyzing the request to determine operating parameters for the cloudlet, analyzing candidate edge tier placements based on the operating parameters, and determining a candidate edge tier placement for the cloudlet based on a candidate edge tier placement that satisfies the operating parameters.

Example 56 includes the method of example 55, wherein the determining of the operating parameters further includes deriving a subset of factors required for the operating parameters.

Example 57 includes the method of any one or more of examples 55 or 56, wherein the subset of factors includes service level agreement (SLA) attributes of the cloudlet.

Example 58 includes the method of any one or more of examples 55-57, wherein the subset of factors includes at least one of a level of security, a level of accuracy, dependencies of the cloudlet on other microservices, a location of the dependencies within the edge environment, or usage information of the cloudlet.

Example 59 includes the method of any one or more of examples 55-58, wherein the determining of the operating parameters includes estimating resource requirements for the cloudlet, the resource requirements including power measurements, thermal measurements, latency measurements, and bandwidth measurements for the cloudlet based on the subset of factors.

Example 60 includes the method of any one or more of examples 55-59, further including updating the resource requirements based on updated operating parameters.

Example 61 includes the method of any one or more of examples 55-60, further including receiving telemetry data from each of the candidate edge tier placements.

Example 62 includes the method of any one or more of examples 55-61, wherein the analyzing of the candidate edge tier placements includes determining resource availabilities of each of the candidate edge tier placements, the resource availabilities corresponding to power availability, thermal availability, latency availability, and bandwidth availability at each of the candidate edge tier placements based on the telemetry data.

Example 63 includes the method of any one or more of examples 55-62, wherein the determining of the candidate edge tier placement for the cloudlet includes determining an operating parameter percentage for each of the candidate edge tier placements, the operating parameter percentage corresponding to a percentage of the resource availabilities of an edge tier placement that satisfy the resource requirements of the cloudlet, selecting the edge tier placement with the optimal operating parameter percentage as the candidate edge tier placement, and implementing the cloudlet at the candidate edge tier placement.

Example 64 includes the method of any one or more of examples 55-63, further including, in response to the operating parameter percentages for each of the candidate edge tier placements not satisfying a threshold, adjusting resource requirements and a cost function weight.

Example 65 is a non-transitory computer readable medium comprising instructions to perform any of examples 55-64.

Example 66 is an edge computing gateway, comprising processing circuitry to perform any of examples 55-64.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for workload placement in an edge environment comprising:
   computer readable instructions; and
   a processor to instantiate or execute the computer readable instructions to:
   receive a request to execute a workload from an edge platform within an edge environment;
   determine, based on the request, operating parameters for the workload from the edge platform;
   access candidate edge tier and edge platform placements based on the operating parameters; and
   determine a candidate edge tier and edge platform placement for the workload based on a candidate edge tier and edge platform placement that satisfies the operating parameters.

2. The apparatus of claim 1, wherein the computer readable instructions cause the processor to derive a subset of factors required for the operating parameters when determining of the operating parameters.

3. The apparatus of claim 2, wherein the subset of factors includes service level agreement (SLA) attributes of the edge platform.

4. The apparatus of claim 2, wherein the subset of factors includes at least one of a level of security, a level of accuracy, dependencies of the edge platform on other microservices, a location of the dependencies within the edge environment, or usage information of the edge platform.

5. The apparatus of claim 2, wherein the computer readable instructions cause the processor to estimate resource requirements for the edge platform, the resource requirements including power measurements, thermal measurements, latency measurements, and bandwidth measurements for the workload based on the subset of factors.

6. The apparatus of claim 5, wherein the computer readable instructions cause the processor to update the resource requirements based on updated operating parameters.

7. The apparatus of claim 6, wherein the computer readable instructions cause the processor to receive telemetry data from each of the candidate edge tier and edge platform placements.

8. The apparatus of claim 7, wherein the computer readable instructions cause the processor to receive resource availabilities of each of the candidate edge tier and edge platform placements, the resource availabilities corresponding to power availability, thermal availability, latency availability and bandwidth availability at each of the candidate edge tier and edge platform placements based on the telemetry data.

9. The apparatus of claim 8, wherein the computer readable instructions cause the processor to:
   determine an operating parameter percentage corresponding to a percentage of the resource availabilities of an edge tier and edge platform placement that satisfy the resource requirements of the edge platform; and
   select the edge tier and edge platform placement with an optimal operating parameter percentage as the candidate edge tier and edge platform placement.

10. The apparatus of claim 9, wherein the computer readable instructions cause the processor to, in response to the operating parameter percentages for each of the candidate edge tier and edge platform placements not satisfying a threshold, adjust resource requirements and a cost function weight.

11. An apparatus for workload placement in an edge environment, the apparatus comprising:
means for retrieving capability data; and
orchestrating means to:
receive a request to execute a workload from an edge platform within an edge environment;
determine, based on the request, operating parameters for the workload from the edge platform;
access, based on communications with the means for retrieving capability data, candidate edge tier and edge platform placements based on the operating parameters; and
determine, based on communications with the means for retrieving capability data, a candidate edge tier and edge platform placement for the workload based on a candidate edge tier and edge platform placement that satisfies the operating parameters.

12. The apparatus of claim 11, wherein the determined operating parameters include service level agreement (SLA) attributes of the edge platform.

13. The apparatus of claim 11, wherein the determined operating parameters include at least one of a level of security, a level of accuracy, dependencies of the edge platform on other microservices, a location of the dependencies within the edge environment, or usage information of the edge platform.

14. The apparatus of claim 13, wherein the determined operating parameters include resource requirements for the edge platform, the resource requirements including power measurements, thermal measurements, latency measurements and bandwidth measurements for the workload based on the determined operating parameters.

15. The apparatus of claim 14, wherein the orchestrating means is to update the resource requirements based on updated operating parameters.

16. The apparatus of claim 15, wherein the orchestrating means is to receive telemetry data from each of the candidate edge tier and edge platform placements.

17. The apparatus of claim 16, wherein the orchestrating means is to receive resource availabilities of each of the candidate edge tier and edge platform placements, the resource availabilities corresponding to power availability, thermal availability, latency availability and bandwidth availability at each of the candidate edge tier and edge platform placements based on the telemetry data.

18. The apparatus of claim 17, wherein the orchestrating means is to:
determine an operating parameter corresponding to a percentage of the resource availabilities of an edge tier and edge platform placement that satisfy the resource requirements of the edge platform; and
select the edge tier and edge platform placement with an optimal operating parameter percentage as the candidate edge tier and edge platform placement.

19. The apparatus of claim 18, wherein the orchestrating means is to, in response to the operating parameter percentages for each of the candidate edge tier and edge platform placements not satisfying a threshold, adjust resource requirements and a cost function weight.

20. A non-transitory computer readable medium comprising data which may be configured into executable instructions and, when configured and executed, cause at least one processor to at least:

access a request to execute a workload from an edge platform within an edge environment;
determine, based on the request, operating parameters for the workload from the edge platform;
access candidate edge tier and edge platform placements based on the operating parameters; and
determine a candidate edge tier and edge platform placement for the workload based on a candidate edge tier and edge platform placement that satisfies the operating parameters.

21. The non-transitory computer readable medium of claim 20, wherein the instructions, when configured and executed, cause the at least one processor to derive a subset of factors required for the operating parameters when determining of the operating parameters.

22. The non-transitory computer readable medium of claim 21, wherein the subset of factors includes service level agreement (SLA) attributes of the edge platform.

23. The non-transitory computer readable medium of claim 21, wherein the subset of factors includes at least one of a level of security, a level of accuracy, dependencies of the edge platform on other microservices, a location of the dependencies within the edge environment, or usage information of the edge platform.

24. The non-transitory computer readable medium of claim 23, wherein the instructions, when configured and executed, cause the at least one processor to estimate resource requirements for the edge platform, the resource requirements including power measurements, thermal measurements, latency measurements, and bandwidth measurements for the workload based on the subset of factors.

25. A method for workload placement in an edge environment comprising:
receiving a request to execute a workload from an edge platform within an edge environment;
determining, based on the request, operating parameters for the workload from the edge platform;
accessing candidate edge tier and edge platform placements based on the operating parameters; and
determining a candidate edge tier and edge platform placement for the workload based on a candidate edge tier and edge platform placement that satisfies the operating parameters.

26. The method of claim 25, wherein the determining of the operating parameters further includes deriving a subset of factors required for the operating parameters.

27. The method of claim 26, wherein the subset of factors includes service level agreement (SLA) attributes of the edge platform.

28. The method of claim 26, wherein the subset of factors includes at least one of a level of security, a level of accuracy, dependencies of the edge platform on other microservices, a location of the dependencies within the edge environment, or usage information of the edge platform.

29. The method of claim 28, wherein the determining of the operating parameters includes estimating resource requirements for the edge platform, the resource requirements including power measurements, thermal measurements, latency measurements, and bandwidth measurements for the workload based on the subset of factors.

30. The method of claim 29, further including updating the resource requirements based on updated operating parameters.

31. The method of claim 30, further including receiving telemetry data from each of the candidate edge tier and edge platform placements.

32. The method of claim 31, wherein the accessing of the candidate edge tier and edge platform placements includes receiving resource availabilities of each of the candidate edge tier and edge platform placements, the resource availabilities corresponding to power availability, thermal availability, latency availability, and bandwidth availability at each of the candidate edge tier and edge platform placements based on the telemetry data.

33. The method of claim 32, wherein the determining of the candidate edge tier and edge platform placement for the edge platform includes:
   determining an operating parameter corresponding to a percentage of the resource availabilities of an edge tier and edge platform placement that satisfy the resource requirements of the edge platform; and
   selecting the edge tier and edge platform placement with an optimal operating parameter percentage as the candidate edge tier and edge platform placement.

34. The method of claim 33, further including, in response to the operating parameter percentages for each of the candidate edge tier and edge platform placements not satisfying a threshold, adjusting resource requirements and a cost function weight.

\* \* \* \* \*